United States Patent
Teague et al.

(10) Patent No.: US 12,252,062 B2
(45) Date of Patent: Mar. 18, 2025

(54) VEHICLE LIGHT AND MOUNTING ASSEMBLY

(71) Applicant: Mach Built, LLC, Tulsa, OK (US)

(72) Inventors: Michael Wayne Teague, Tulsa, OK (US); Connor Michael Teague, Tulsa, OK (US); Gregory Royce Rex, Tulsa, OK (US)

(73) Assignee: Mach Built, LLC, Tulsa, OK (US)

( * ) Notice: Subject to any disclaimer, the term of this patent is extended or adjusted under 35 U.S.C. 154(b) by 177 days.

(21) Appl. No.: 18/145,474

(22) Filed: Dec. 22, 2022

(65) Prior Publication Data

US 2023/0191982 A1 Jun. 22, 2023

Related U.S. Application Data

(60) Provisional application No. 63/292,516, filed on Dec. 22, 2021.

(51) Int. Cl.
*B60Q 1/18* (2006.01)
*B60Q 1/04* (2006.01)
(Continued)

(52) U.S. Cl.
CPC .............. *B60Q 1/0483* (2013.01); *B60Q 1/18* (2013.01); *B60Q 1/26* (2013.01); *B60Q 1/2615* (2013.01); *B60R 11/04* (2013.01); *B60Q 2900/10* (2013.01)

(58) Field of Classification Search
CPC .......... B60Q 1/0483; B60Q 1/18; B60Q 1/26; B60Q 1/2615; B60Q 2900/10;
(Continued)

(56) References Cited

U.S. PATENT DOCUMENTS 4,396,972 A * 8/1983 Kaneko ................... B64F 1/20
362/184
4,882,667 A * 11/1989 Skegin ................... F21V 21/34
362/345
(Continued)

FOREIGN PATENT DOCUMENTS

CN 207006993 U * 2/2018
CN 213019213 U 4/2021
(Continued)

OTHER PUBLICATIONS

English Translation of CN-207006993-U-GUAN Z-Feb. 13, 2018 (Year: 2018).*

(Continued)

*Primary Examiner* — Zheng Song
*Assistant Examiner* — Glenn D Zimmerman
(74) *Attorney, Agent, or Firm* — Crowe & Dunlevy, P.C.

(57) ABSTRACT

The invention disclosed herein is directed to a vehicle light and mounting assembly that extends the functionality of light brackets and housings by allowing commonly used accessories to be removably attached to a vehicle by other method, means, and in other locations. The vehicle light and mounting assembly includes a light housing assembly and a mounting assembly. The light housing assembly and the accessories are removably mounted, respectively, using the mounting assembly. The light housing assembly can be configured as a headlight, taillight, and/or auxiliary lights that can be removably mounted to a motorcycle, bicycle, truck, sports utility vehicle, car, recreational vehicle, trailer, first-alert vehicle, and any other motorized or unmotorized vehicle using the mounting assembly.

24 Claims, 34 Drawing Sheets

(51) Int. Cl.
*B60Q 1/26* (2006.01)
*B60R 11/04* (2006.01)
*B60R 1/04* (2006.01)

(58) Field of Classification Search
CPC .... B60R 11/04; F21V 19/0045; F21V 21/116; F21V 21/34
See application file for complete search history.

(56) References Cited

U.S. PATENT DOCUMENTS

| | | | |
|---|---|---|---|
| 4,929,133 A * | 5/1990 | Wiseman | B64C 1/20 410/67 |
| 5,205,633 A | 4/1993 | Kasboske | |
| 7,987,623 B1 * | 8/2011 | Moody | F41G 11/003 42/71.01 |
| 9,352,682 B2 | 5/2016 | Lombrozo | |
| 10,036,614 B1 * | 7/2018 | Ruiz | F41G 11/003 |
| 10,071,673 B2 | 9/2018 | Van Buren et al. | |
| 10,266,104 B2 | 4/2019 | Wymore et al. | |
| 10,493,901 B2 | 12/2019 | Schermerhorn et al. | |
| 10,953,788 B2 | 3/2021 | Kastanis et al. | |
| 11,060,710 B2 | 7/2021 | Ko | |
| 2011/0109129 A1 | 5/2011 | Brill | |
| 2018/0029714 A1 | 2/2018 | Lucas et al. | |
| 2018/0051959 A9 | 2/2018 | Sharron et al. | |
| 2018/0216796 A1 * | 8/2018 | Suzuki | B60Q 3/64 |
| 2021/0010654 A1 | 1/2021 | Ko | |

FOREIGN PATENT DOCUMENTS

| | | | |
|---|---|---|---|
| DE | 202017105138 U1 * | 11/2017 | ......... B64D 11/0619 |
| KR | 20100007316 U | 7/2010 | |
| WO | 2018148698 A1 | 8/2018 | |

OTHER PUBLICATIONS

International Search Report and Written Opinion PCT/US2022/082241 dated Jun. 23, 2023.

* cited by examiner

VEHICLE LIGHT AND MOUNTING ASSEMBLY

CROSS-REFERENCE TO RELATED APPLICATIONS

This application claims the benefit of U.S. Provisional Patent Application No. 63/292,516 filed Dec. 22, 2021, and incorporates said provisional application by reference into this document as if fully set out at this point.

BACKGROUND OF THE INVENTION

1. Field of the Invention

This invention generally relates to a vehicle light and mounting assembly.

2. Description of the Related Art

Many owners and drivers of off-road vehicles choose to enhance their stock vehicles with aftermarket accessories. Such accessories might include, for example, light guards, snorkels, winches, wheels, suspensions, special ruggedized tires, and the like. While some off-road accessories are decorative, most enhance the vehicle's resiliency and survivability or enhance the driver's experience when the vehicle is driven on very demanding and often punishing off-road terrain.

One accessory often added to an off-road vehicle is auxiliary lighting to make the path ahead more visible when off-roading after dark or in the rain and fog. Auxiliary lighting can take many forms such as, for instance, spotlights mounted on the windshield pillars, spotlights mounted on the roof of the vehicle, lights mounted on the front fender and/or its bars, spotlights mounted on a roll bar, and even lights mounted on the hood. While these solutions for providing additional light have proven useful, they nevertheless have certain problems and shortcomings inherent in their respective designs.

For example, the lights and mounting structures of prior art auxiliary lighting tend to be dedicated and permanent once mounted to the vehicle. It is difficult or impossible to exchange one type of lighting fixture for another when desired or to reconfigure the lighting configuration. Further, the positioning of individual lights is generally fixed in prior art auxiliary lighting. There is also little provision in the prior art for mounting accessories other than lights, such as, for instance, mirrors or sports cameras. Moreover, there are no provisions in the prior art for mounting other accessories directly to the light fixture itself or for the lighting assembly to be used as a tactical storage box, a document storage box, or other storage boxes.

BRIEF SUMMARY OF THE INVENTION

The invention relates to a vehicle light and mounting assembly. The light assembly includes a light housing assembly having a light housing and a light cover. The light assembly includes a rail mounting system with one or more mounting rails that are removably coupled to or integrated into the light housing assembly. The vehicle light assembly can include a clamping assembly for attachment to the rear end of a vehicle.

Accordingly, it is an object of this invention to provide a vehicle light and mounting assembly that extends the functionality of light brackets and housings by adding the ability to affix commonly used vehicle or other common accessories.

Another object of this invention is to provide a vehicle light assembly having an internal compartment configured to be used as a tactical storage box, a document storage box, or the like.

A further object of this invention is to provide a rail mounting assembly having a unitary construction and configured to removably attach one or more accessories, such as one or more gas cans, handguns, spot, flood, reverse, and/or running lights, a citizens band (CB) and radio antennas, flags, cameras, video recorders, steps, bike racks, license plates, electrical plug-ins and auxiliary ports, mechanical connections, or a combination thereof. The rail mounting system can be integrated into the vehicle light assembly or used without the light assembly as a standalone unit. The mounting rails may be configured as Picatinny rails, Weaver rails, or seat track rails.

A further object of this invention is to provide a rail mounting assembly having a longitudinal body portion with an upper surface, a lower surface, and one or more mounting rails, more particularly, a pair of parallel seat track mounting rails, formed in the body portion of the rail mounting assembly. The parallel seat track mounting rails are spaced close enough to be used together for mounting one accessory.

In a first aspect, the invention relates to a vehicle light assembly having a light housing assembly and a mounting assembly. The light housing assembly has a light housing, a light cover attached to the light housing, and a vehicle light. The mounting assembly has one or more rigid mounting rails configured to removably attach and detach one or more accessories thereto. The rigid mounting rails are removably coupled to the light housing assembly, having a unitary construction with the light housing assembly, or both. The light housing assembly, the mounting assembly, or both can be constructed from metal, aluminum, stainless steel, carbon fiber, or a combination thereof.

The assembly can also include one or more quick release rail lock mechanisms configured to removably couple the accessory to the mounting assembly. In addition, the light housing assembly can include an internal compartment with a light cover lock assembly. The light cover can include one or more protruding lock pins configured to be received within one or more light cover recess latches on the light housing.

The mounting rails of the mounting assembly can be Picatinny, Weaver, seat track mounting rails, or a combination thereof. The mounting rails can have a longitudinal body portion with an upper surface, a lower surface, and spaced apart access openings. The mounting rails can also have a plurality of longitudinally spaced apart grooves and ridges extending in a transverse direction. The light housing may also have one or more rail recesses for receipt of one or more of the mounting rails. The rail recess may have one or more annular attachment protrusions configured to be received within one or more attachment apertures on a rear surface of the mounting rail.

The mounting assembly can be a seat track mounting assembly having a plurality of seat track rails in a superior-inferior orientation, an anterior-posterior orientation, or a combination thereof. The seat track rails cab milled or otherwise constructed directly into the light housing assembly. The seat track rails can have a generally C-shaped cross-section defined by a horizontal lower portion extending laterally between upstanding outer side walls and horizontal upper portions respectively extending laterally from each of the upstanding outer side walls forming a channel therein. In addition, each seat track rail can have a longitudinal body portion with an upper surface, a lower surface, and spaced apart openings. The longitudinal body portion of each seat track rail is oriented parallel to the other. The seat track rail can also include a plurality of longitudinally spaced apart mounting assembly apertures extending in a transverse direction, with each mounting assembly aperture disposed within an opening. In addition, the seat track can include a plurality of longitudinally spaced apart longitudinal apertures, with each longitudinal aperture disposed between two mounting assembly apertures. The seat track rails of the seat track mounting assembly are spaced for mounting a single accessory.

For removably attaching the vehicle light assembly to a vehicle, the light housing assembly can have one or more angled housing fingers, and a clamping assembly is used to attach the assembly to the vehicle. The clamping assembly includes a mounting block having an inner contact surface, and the inner contact surface can have a contoured ridge and a terminal edge forming an intermediate contoured channel. The contoured channel may have one or more fastener apertures.

In general, in a second aspect, the invention relates to a vehicle light assembly having a light housing assembly constructed as a unitary light housing with a top exterior surface, a bottom exterior surface, exterior side surfaces, a front exterior surface, and a rear exterior surface. The vehicle light assembly also has a seat track mounting assembly with one or more seat track rails milled or otherwise constructed directly into the unitary light housing. The seat track mounting assembly has a generally C-shaped cross-section defined by a horizontal lower portion extending laterally between upstanding outer side walls and horizontal upper portions respectively extending laterally from each of the upstanding outer side walls forming a channel therein.

The seat track rail of the seat track mounting assembly can include a longitudinal body portion with an upper surface, a lower surface, and spaced apart openings, wherein the longitudinal body portion of each seat track rail is oriented parallel to the other; a plurality of longitudinally spaced apart mounting assembly apertures extending in a transverse direction, wherein each mounting assembly aperture is disposed within an opening; and a plurality of longitudinally spaced apart longitudinal apertures, wherein each longitudinal aperture is disposed between two mounting assembly apertures.

The light housing assembly also includes a clamping assembly for attachment to a rear end of a vehicle. The clamping assembly has a mounting block with an inner contact surface having a contoured ridge and a terminal edge forming an intermediate contoured channel. The contoured channel has one or more fastener apertures.

In general, in a third aspect, the invention relates to a seat track mounting assembly having two or more seat track rails constructed on a unitary seat track mounting assembly body. The seat track rails have a generally C-shaped cross-section defined by a horizontal lower portion extending laterally between upstanding outer side walls and horizontal upper portions respectively extending laterally from each of the upstanding outer side walls forming a channel therein. The seat track rail also has a longitudinal body portion with an upper surface, a lower surface, and spaced apart openings, with the longitudinal body portion of each seat track rail oriented parallel to the other. In addition, the seat track rail has a plurality of longitudinally spaced apart mounting assembly apertures extending in a transverse direction, with each mounting assembly aperture disposed within an opening. Moreover, the seat track rail has a plurality of longitudinally spaced apart longitudinal apertures, wherein each longitudinal aperture is disposed between two mounting assembly apertures.

BRIEF DESCRIPTION OF THE DRAWINGS

The above and other objects and advantages of this invention may be more clearly seen when viewed in conjunction with the accompanying drawing wherein.

DETAILED DESCRIPTION OF THE INVENTION

Figure 1:
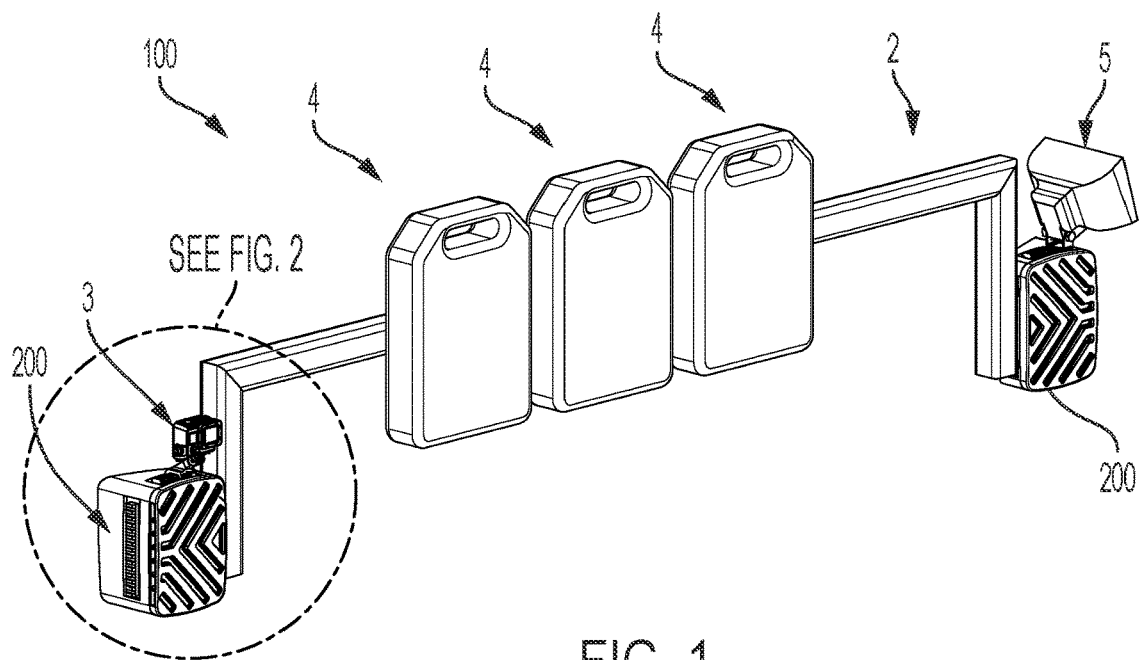
FIG. 1 is a perspective view of an example of a vehicle light and mounting assembly removably attached to a mounting assembly and with accessories removably attached thereto in accordance with an illustrative embodiment of the invention disclosed herein.

While this invention is susceptible to embodiment in many different forms, there are shown in the drawings and will herein be described in detail some specific embodiments of the invention. It should be understood, however, that the present disclosure is to be considered an exemplification of the principles of the invention and is not intended to limit the invention to the specific embodiments so described.

The invention is directed to a vehicle light and mounting assembly, which extends the functionality of light brackets, housings, and mounting assemblies by allowing commonly used accessories to be easily attached and detached. The vehicle light assembly includes a light housing assembly and a rail mounting assembly. The mounting assembly includes one or more mounting rails configured as Picatinny rails, Weaver rails, seat track rails, or the like.

The vehicle light assembly can be configured as a headlight, taillight, and/or auxiliary lights that can be removably mounted to a motorcycle, bicycle, automobile, truck, utility vehicle, recreational vehicle, trailer, first-alert/responder vehicle, and other motorized or unmotorized vehicle. The vehicle light assembly and/or the mounting assembly can be constructed from any suitable materials, such as metal, aluminum, stainless steel, carbon fiber, or the like. Moreover, the vehicle light assembly and/or the mounting assembly can be constructed from a combination of such materials depending upon the anticipated usage and design of the invention. The vehicle light and mounting assembly can each be constructed as a unitary, single piece, for example, they can be milled from a single aluminum block to provide additional strength, rigidity, and torque resistance.

One or more vehicle accessories can be removably attached to and detached from the vehicle light and mounting assembly. The accessories can include, but are not limited to, one or more gas cans, handguns, spot, flood, reverse, and/or running lights, steps, cup holders, table extensions, citizens band (CB) and radio antennas, flags, cameras, video recorders, steps, bike racks, license plates, electrical plug-ins and auxiliary ports, mechanical connections, or any other desired accessory (ies). Certain accessories, such as a strap or other fastening device, can be used to aid in stabilizing a receiver hitch cargo load rack, in restraining items, such as a ladder, kayak, or surfboard, or in enabling recreational activities, such as a hammock, tent, or slack line. Other accessories could be used to permit the light assembly to be used to lift the vehicle.

Figure 2:
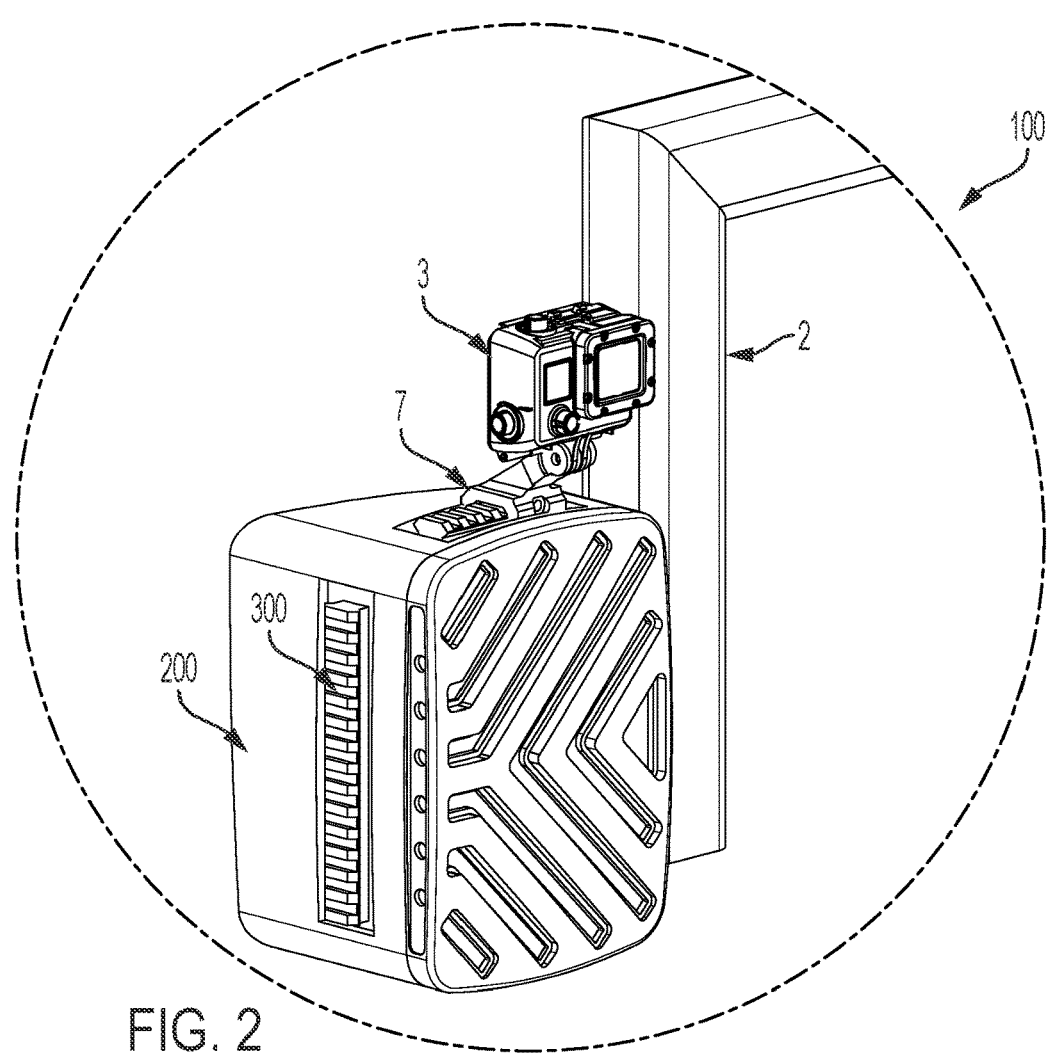
FIG. 2 is an enlarged perspective view of area 2 in FIG. 1 of a camera accessory removably attached to one of the vehicle light assemblies.

Referring now to the figures of the drawings, wherein like numerals of reference designate like elements throughout the several views, and initially to FIGS. 1 through 7, a vehicle light and mounting assembly 100 includes a light housing assembly 200 and a rail mounting assembly 300. The rail mounting assembly 300 includes one or more mounting rails 6 that are removably coupled to the light housing assembly 200 (FIGS. 1-3) or integrated into the light housing assembly 200 (FIGS. 4-7). The rail mounting assembly 300 of the vehicle light and mounting assembly 100 also includes one or more quick release rail lock mechanisms 7 configured to removably couple an accessory 3, 4, 5, the light housing assembly 200, or both to a vehicle mounting rail 2. The quick release mechanism 7 can be a threaded fastener with an oversized thread nut and bolt having a head configured to engage and be retained within the rail mounting assembly 300. As illustrated in FIGS. 1 and 2, a camera accessory 3 and a light accessory 5 are removably mounted to mounting rails 6 on the light housing assembly 200 using rail lock mechanisms 7, and the light housing assembly 200 and gas can accessories 4 are removably coupled to the vehicle mounting rail 2 using rail lock mechanisms 7. The mounting rail 2 is attached at a desired location on the vehicle using known attachment mechanisms.

Figure 3:
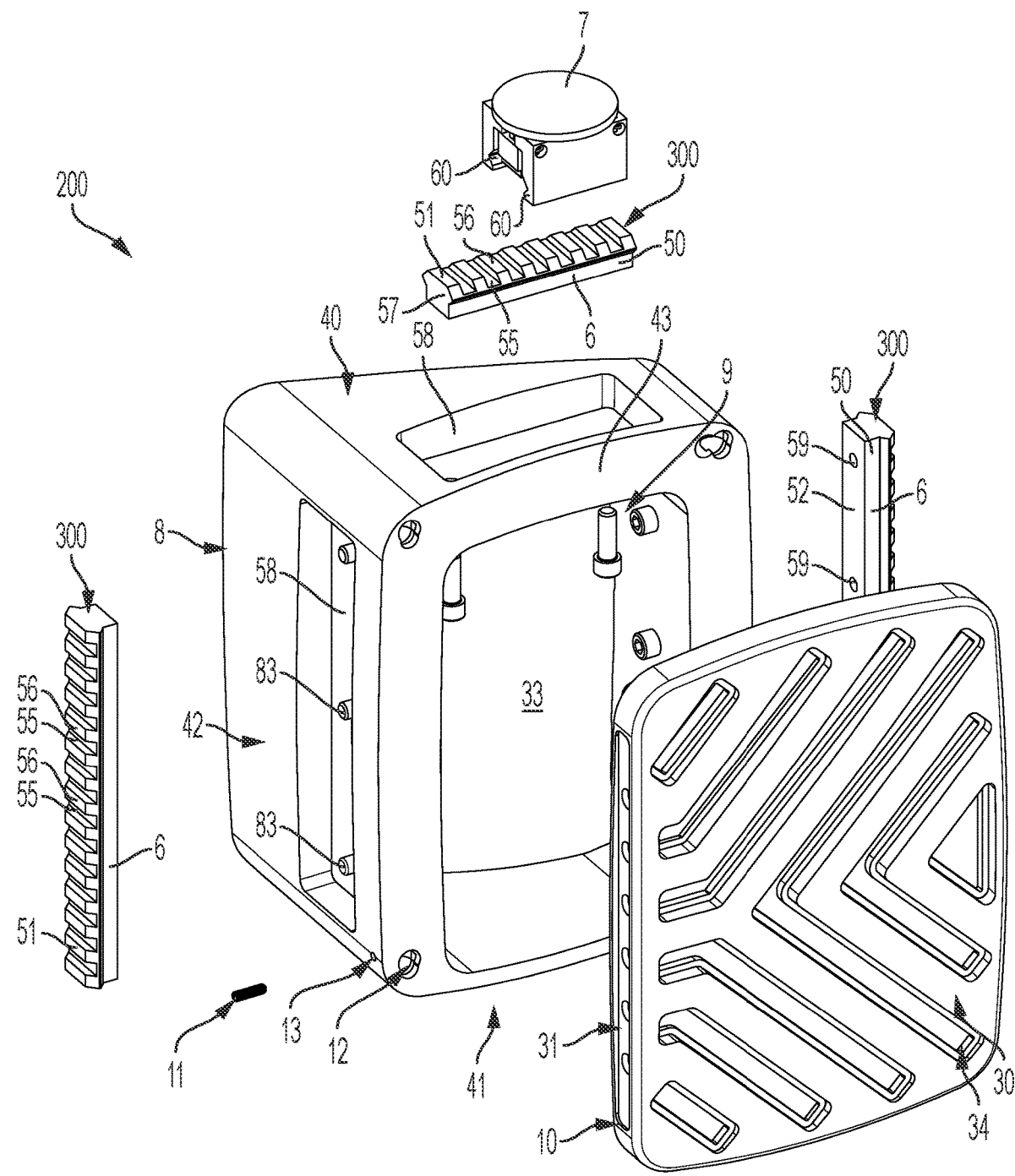
FIG. 3 is an exploded perspective view of an example of a vehicle light assembly having a removable rail mounting assembly in accordance with an illustrative embodiment of the invention disclosed herein.
Figure 4:
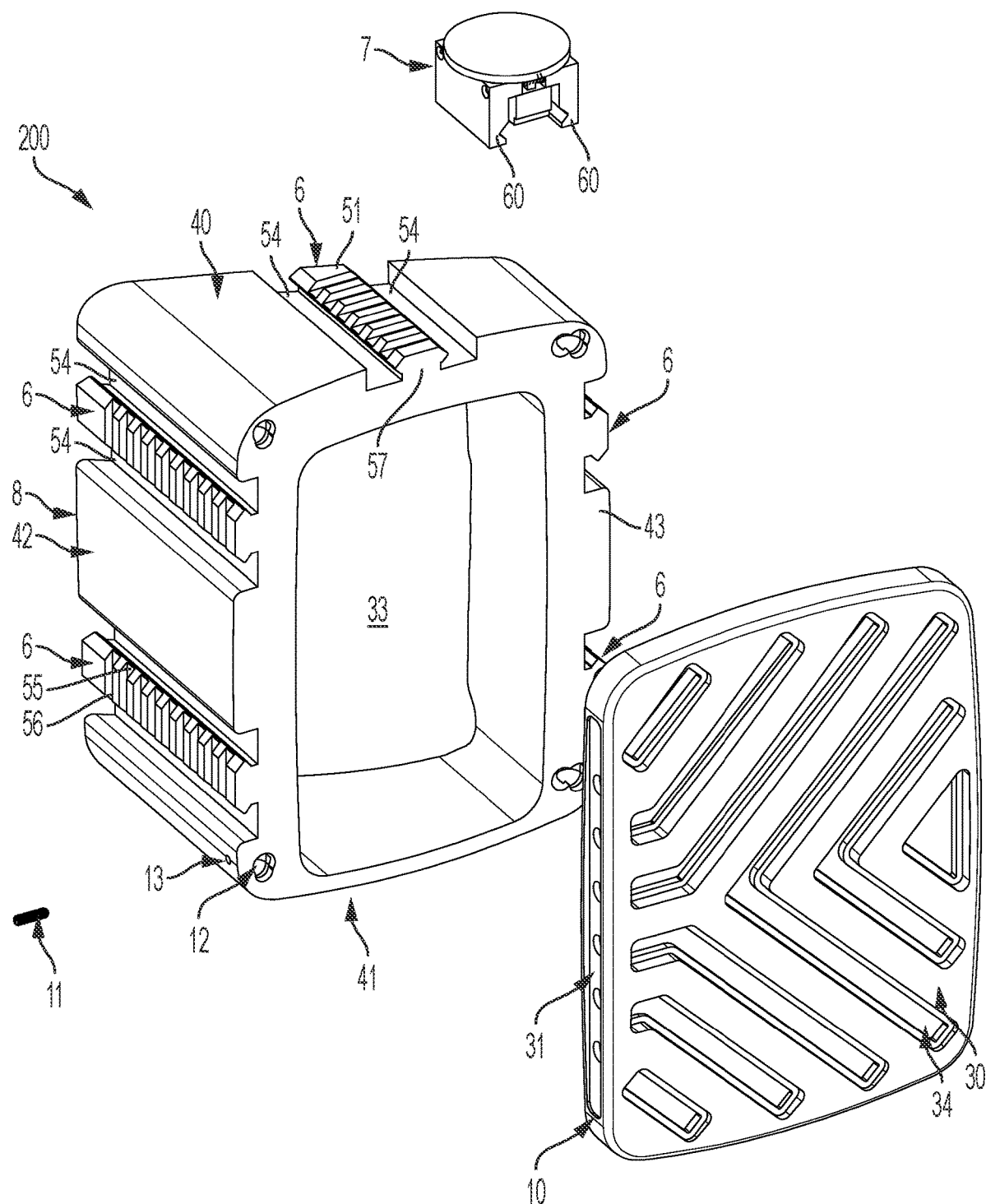
FIG. 4 is an exploded perspective view of an example of a vehicle light assembly having an integral rail mounting assembly in accordance with an illustrative embodiment of the invention disclosed herein.
Figure 5A:
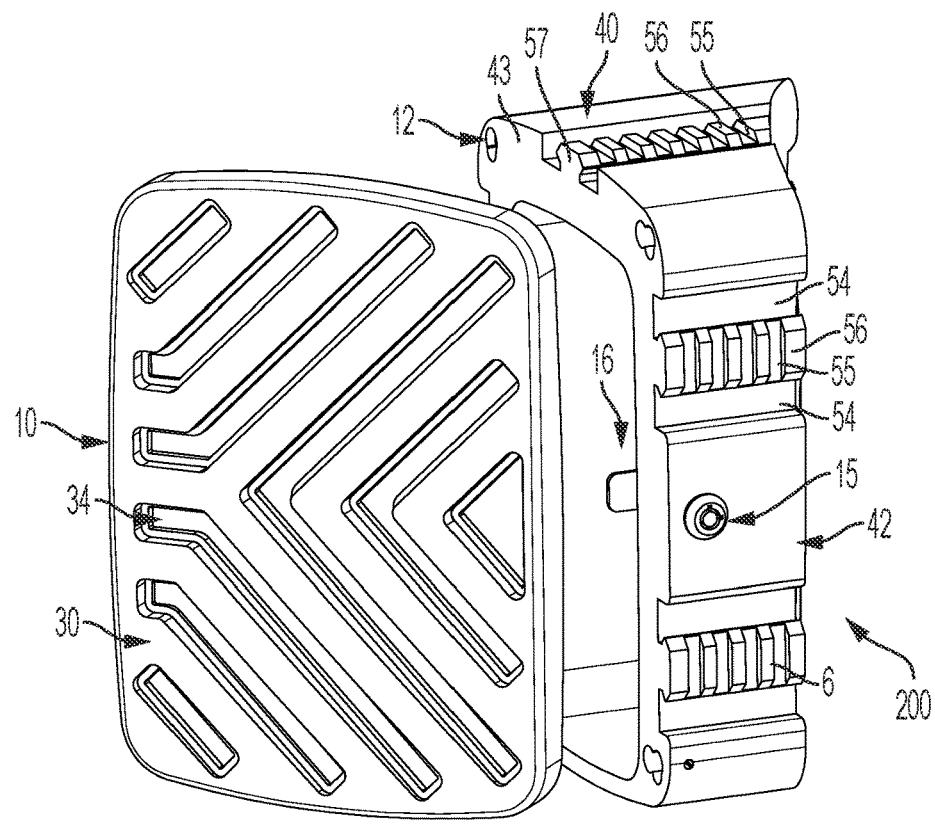
FIG. 5A is a partially exploded perspective view of an example of a vehicle light assembly having an internal compartment with a keyed lock in accordance with an illustrative embodiment of the invention disclosed herein.
Figure 5B:
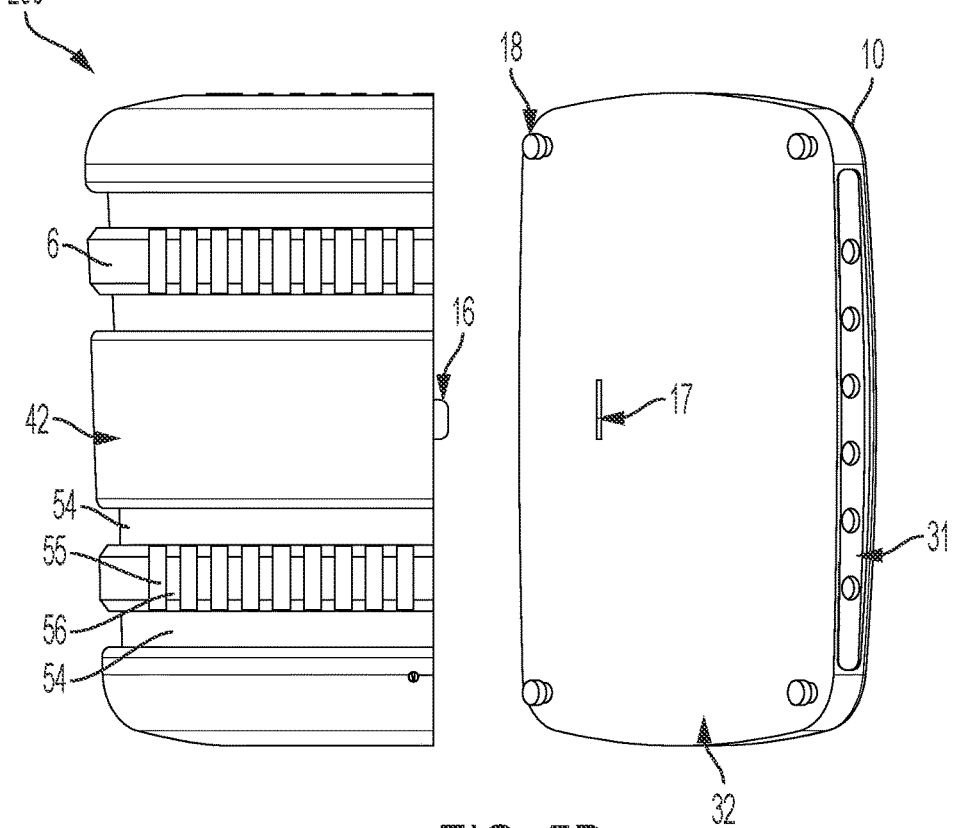
FIG. 5B is a partially exploded side perspective view of the vehicle light assembly shown in FIG. 5A.

As illustrated in FIGS. 3-5, the light housing assembly 200 can include a light housing 8 and a durable light cover 10 having a lens 34 on a front surface 30 thereof. In some embodiments, the light cover 10 has an additional integral lens 35 on at least one side surface 31 thereof. In other embodiments, the light cover 10 has one or more LED lights or other lighting components 36 integrated or removably attached on one or more surfaces thereof or is otherwise configured to permit a custom lighting solution. An internal storage compartment 33 can be formed within the light housing 8 and the light cover 10. A light cover 10 having thicker side surfaces 31 may be used to form the internal storage compartment 33 having a greater depth and volume within the light housing 8 and the light cover 10. A rear surface 32 of the light cover 10 can include one or more protruding lock pins 18 that are received within one or more light cover recess latches 23 on the light housing 8. The light cover 10 is removably attached to a front exterior surface 43 of the light housing 8 using a set screw 11 that passes through a set screw aperture 13 on the light housing 8 to engage one of the locks pins 18 in the light cover 10. In addition, as shown in FIGS. 5A and 5B, the light housing assembly 200 can include a lock assembly having a keyed cylinder lock 15 with a rotating lock tab 16 that is received within and engages a lock slot 17 on the rear surface 32 of the light cover 10.

The mounting rails 6 can be removably attached (FIGS. 1-3) or integrated onto (FIGS. 4-7) an exterior surface 40, 41, 42 of the light housing 8. As exemplified in FIGS. 1 through 3, the mounting rails 6 are configured as Weaver rails having a longitudinal body portion 50 with an upper surface 51, a lower surface 52, and spaced apart access openings 54. FIGS. 4 through 7 exemplify the mounting rails 6 configured as integrated Weaver rails with an upper surface 51 and spaced apart access openings 54. The mounting rails 6 can be constructed onto or attached to the exterior surface 40, 41, 42 of the light housing 8 such that the longitudinal body portion 50 of a mounting rail 6 extends vertically, horizontally, substantially vertically, or substantially horizontally. Further, more than one mounting rail 6 can be positioned onto a single exterior surface 40, 41, 42 of the light housing 8. The mounting rails 6 have a plurality of longitudinally spaced apart grooves 55 and ridges 56 extending in a transverse direction. The longitudinal mounting rails 6 can have a dovetail profile 57 on which two clamps 60 of the rail lock mechanism 7 are guided and engaged. More than one rail lock mechanism 7 can be simultaneously engaged onto the mounting rails 6 at different positions along the longitudinal body portion 50. The accessory 3, 4, 5 or the light housing assembly 200 can be removably secured to the rail lock mechanism 7 using screws, bolts, magnets, or other suitable connections. In other embodiments, the accessories 3, 4, 5 can be integrated into the rail lock mechanism 7.

As shown in FIG. 3, the exterior surface 40, 41, 42 of the light housing 8 has mounting rail recesses 58 for receipt of the mounting rails 6. As exemplified, each of the rail recesses 58 has one or more annular attachment protrusions 83 that are received within one or more attachment apertures 59 on the lower surface 52 of the respective mounting rail 6. Each of the mounting rails 6 are seated within the rail recesses 58 and are removably attached to the light housing 8 using attachment devices 9. As shown in FIG. 4, the mounting rails 6 are integrated, formed onto, or molded or milled directly into the exterior surfaces 40, 41, 42 of the light housing 8. The mounting rails 6 can have a superior-inferior orientation on the side exterior surfaces 42 of the light housing 8 and an anterior-posterior orientation on the top and bottom exterior surfaces 40, 41 of the light housing 8 as shown in FIG. 3. The mounting rails 6 can have an anterior-posterior orientation along the light housing assembly 200 as shown in FIG. 4.

Figure 6A:
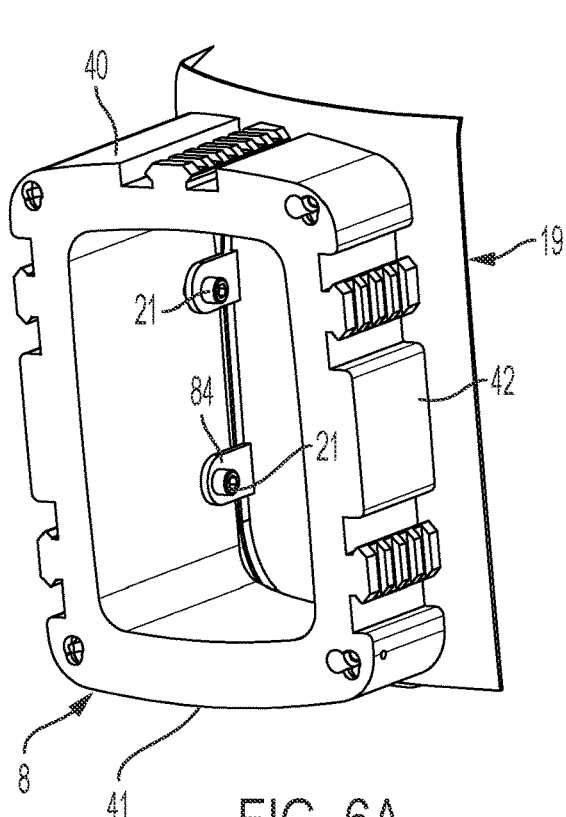
FIG. 6A is a perspective view of an example of a vehicle light assembly attached to a vehicle in accordance with an illustrative embodiment of the invention disclosed herein.
Figure 6B:
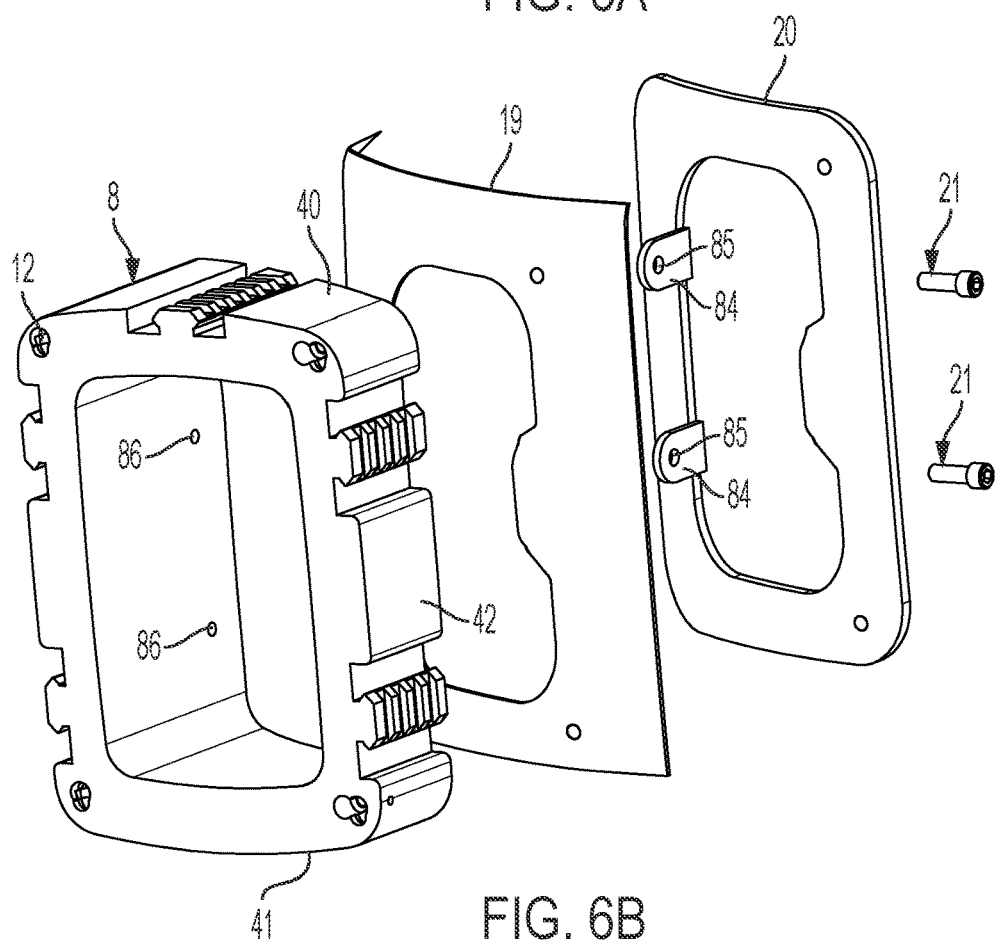
FIG. 6B is an exploded perspective view of the vehicle light assembly shown in FIG. 6A.

Referring now to FIGS. 6A and 6B, the light assembly 200 can be removably secured to a rear end of the vehicle using vehicle mounting assembly 300. The vehicle mounting assembly 300 includes a reinforcement plate 20 that contacts with and attaches to the vehicle and a vehicle panel 19 overlaying the reinforcement plate 20 and intermediate with the rear surface 44 of the light housing 8. As illustrated, the reinforcement plate 20 includes a plurality of upturned attachment protrusions 84 having an attachment aperture 85 thereon. A retaining device or bolt 21 is passed through the attachment aperture 85 and secured within attachment apertures 86 in the internal compartment of the light housing 8.

Figure 7A:
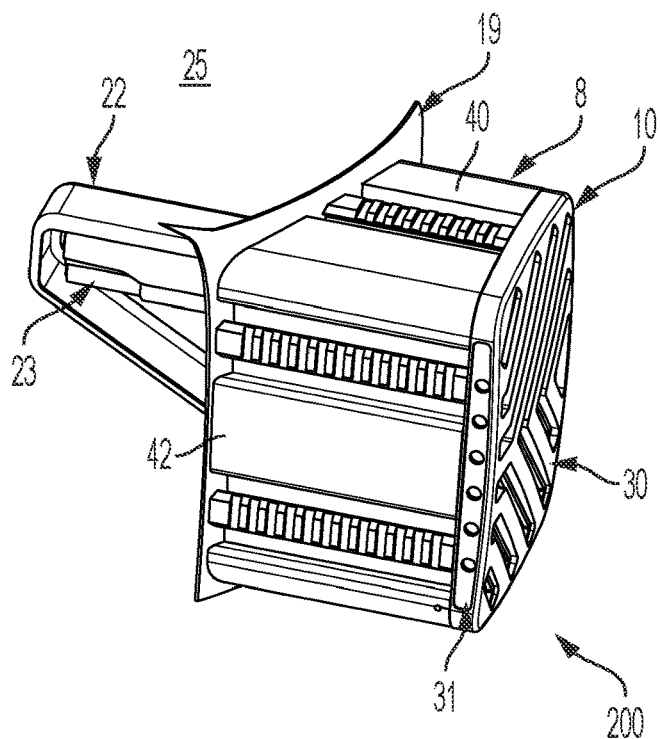
FIG. 7A is a perspective view of an example of a vehicle light assembly having an accessory housing removable inserted in an internal compartment in accordance with an illustrative embodiment of the invention disclosed herein.
Figure 7B:
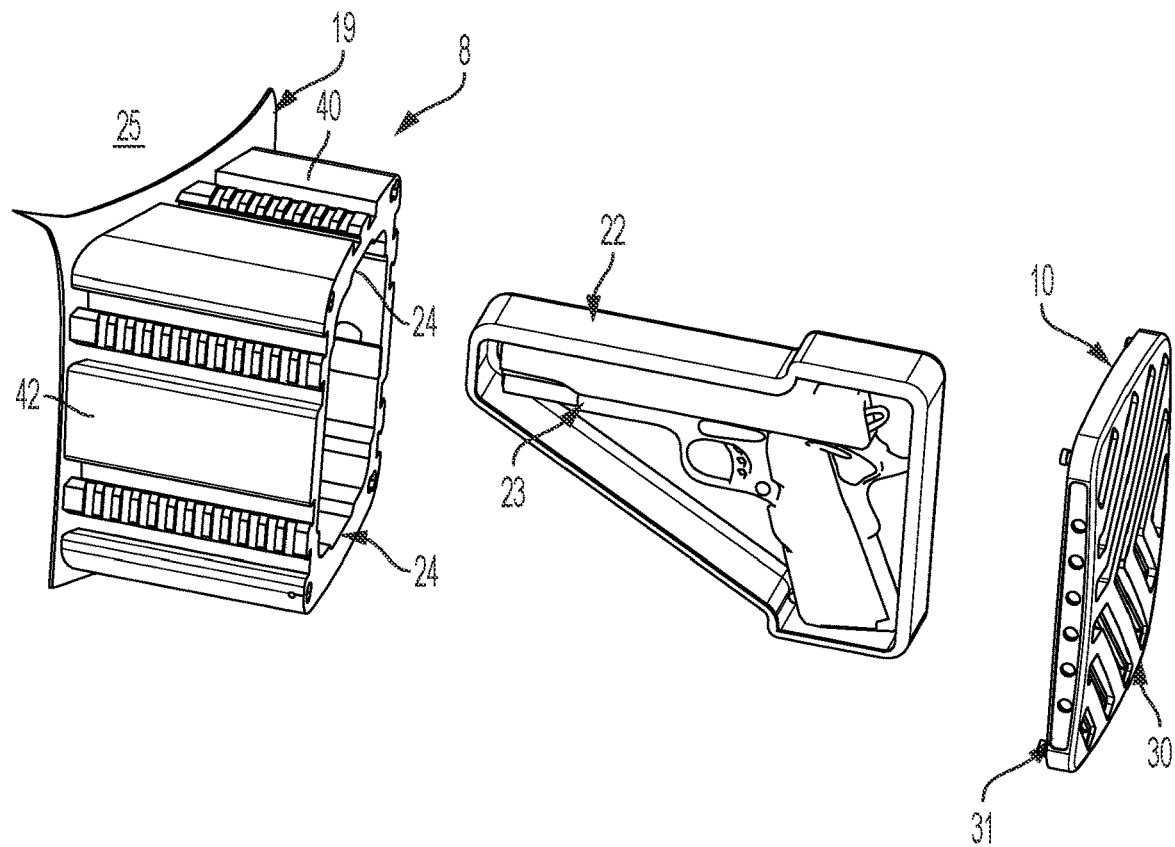
FIG. 7B is an exploded perspective view of the vehicle light assembly shown in FIG. 7A.
Figure 8:
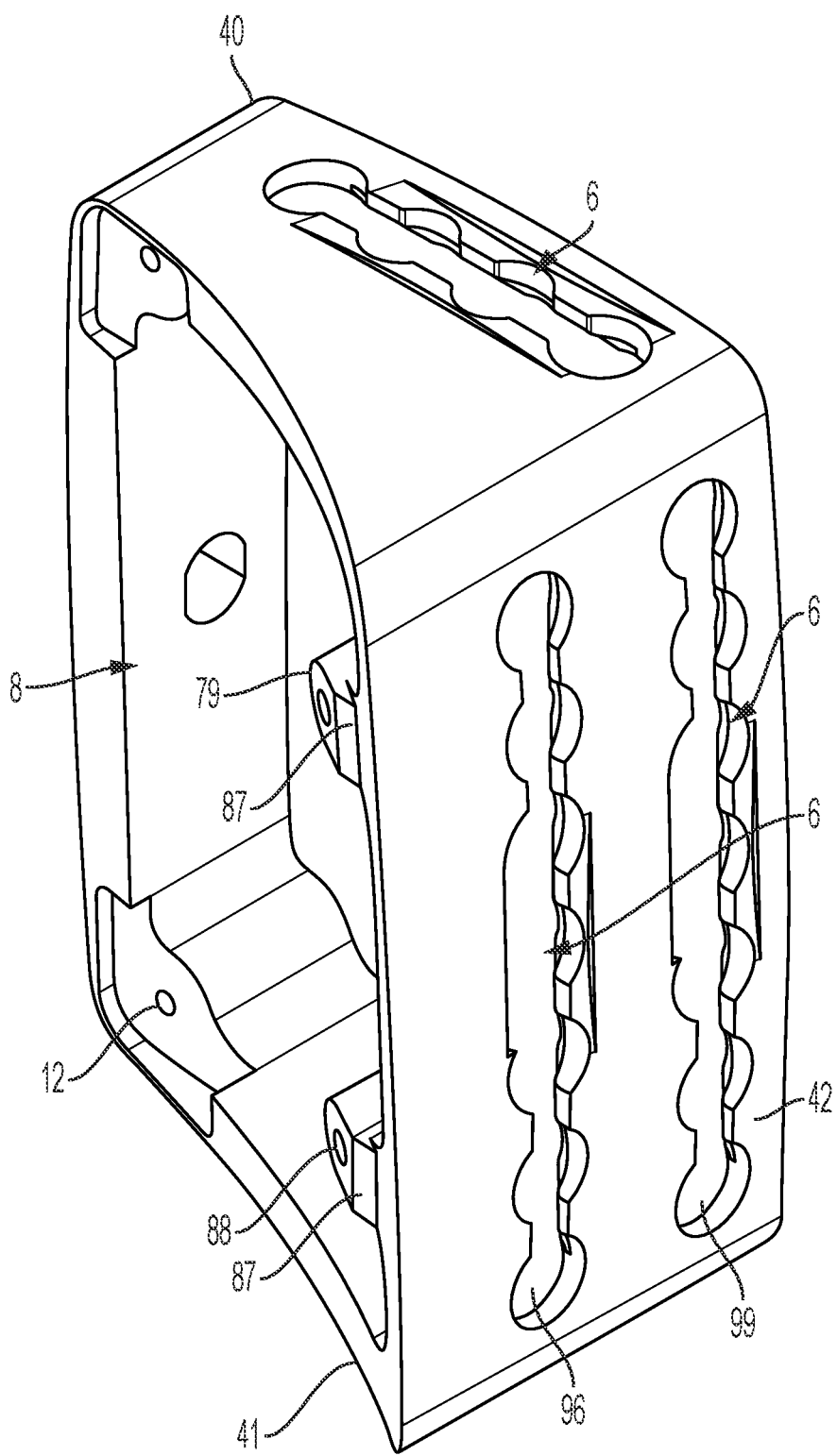
FIG. 8 is a perspective view of an example of a light housing having integral seat track mounting rails in accordance with an illustrative embodiment of the invention disclosed herein.
Figure 9:
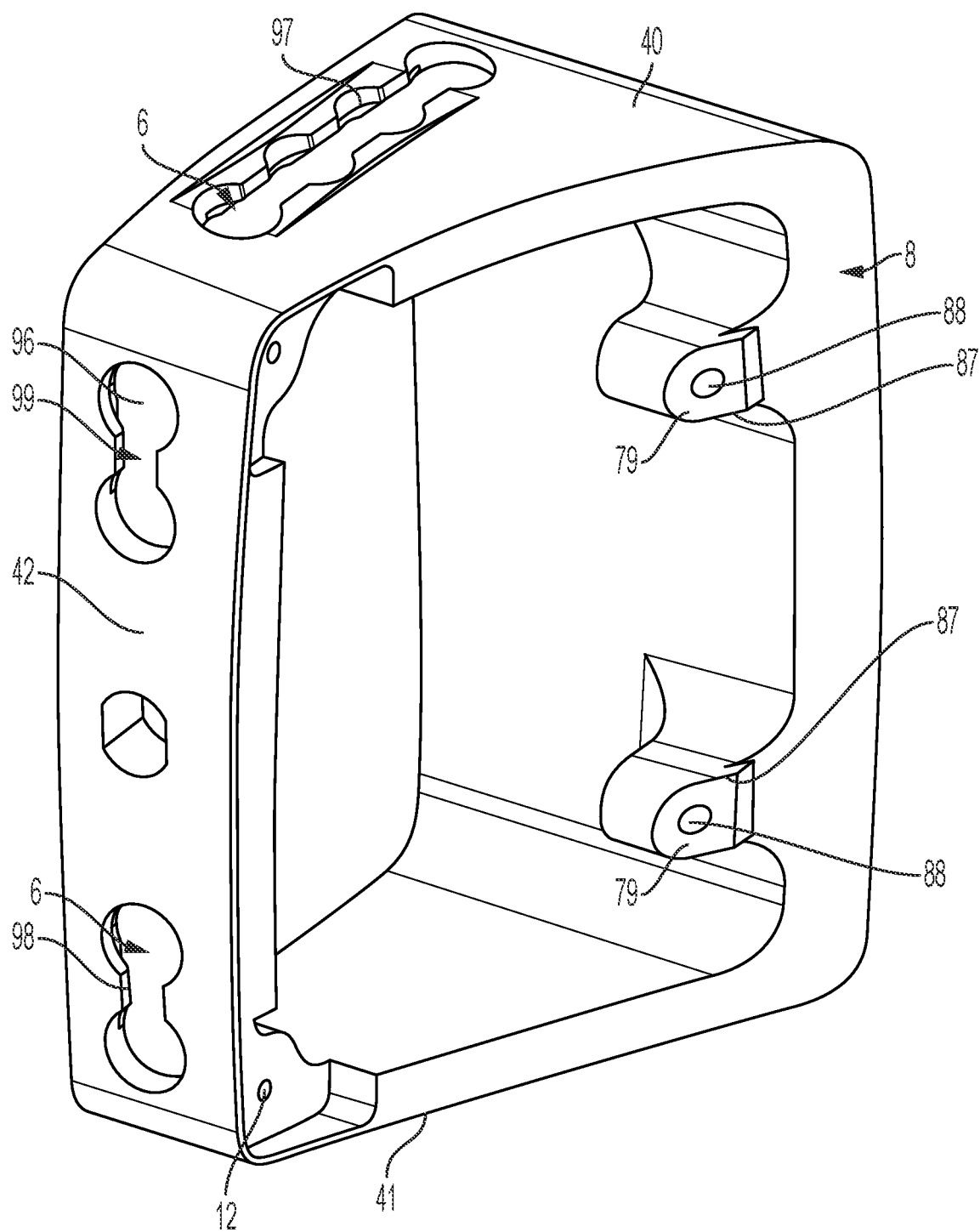
FIG. 9 is another perspective view of the light housing shown in FIG. 8.
Figure 10:
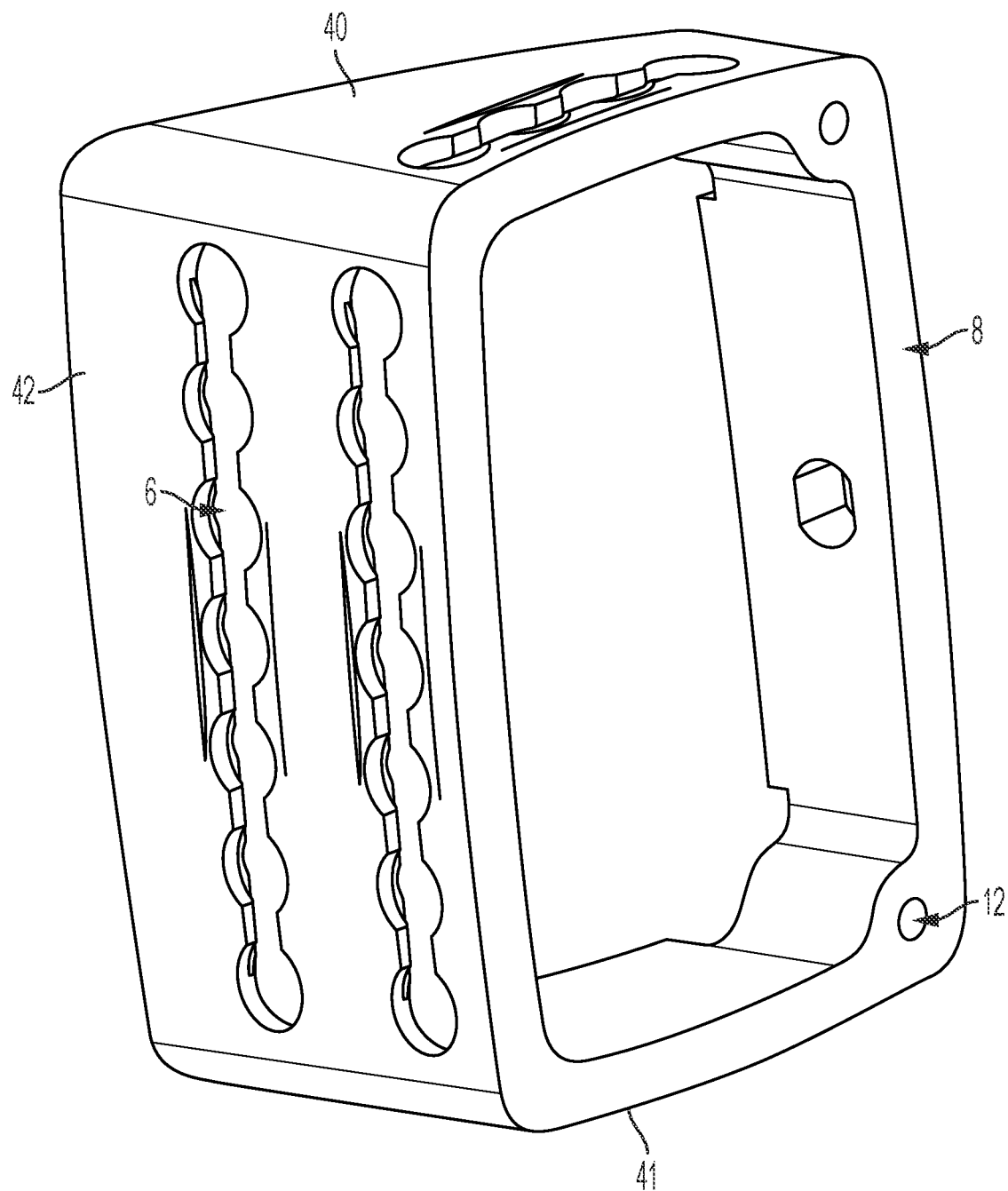
FIG. 10 is another perspective view of the light housing shown in FIG. 8.
Figure 11:
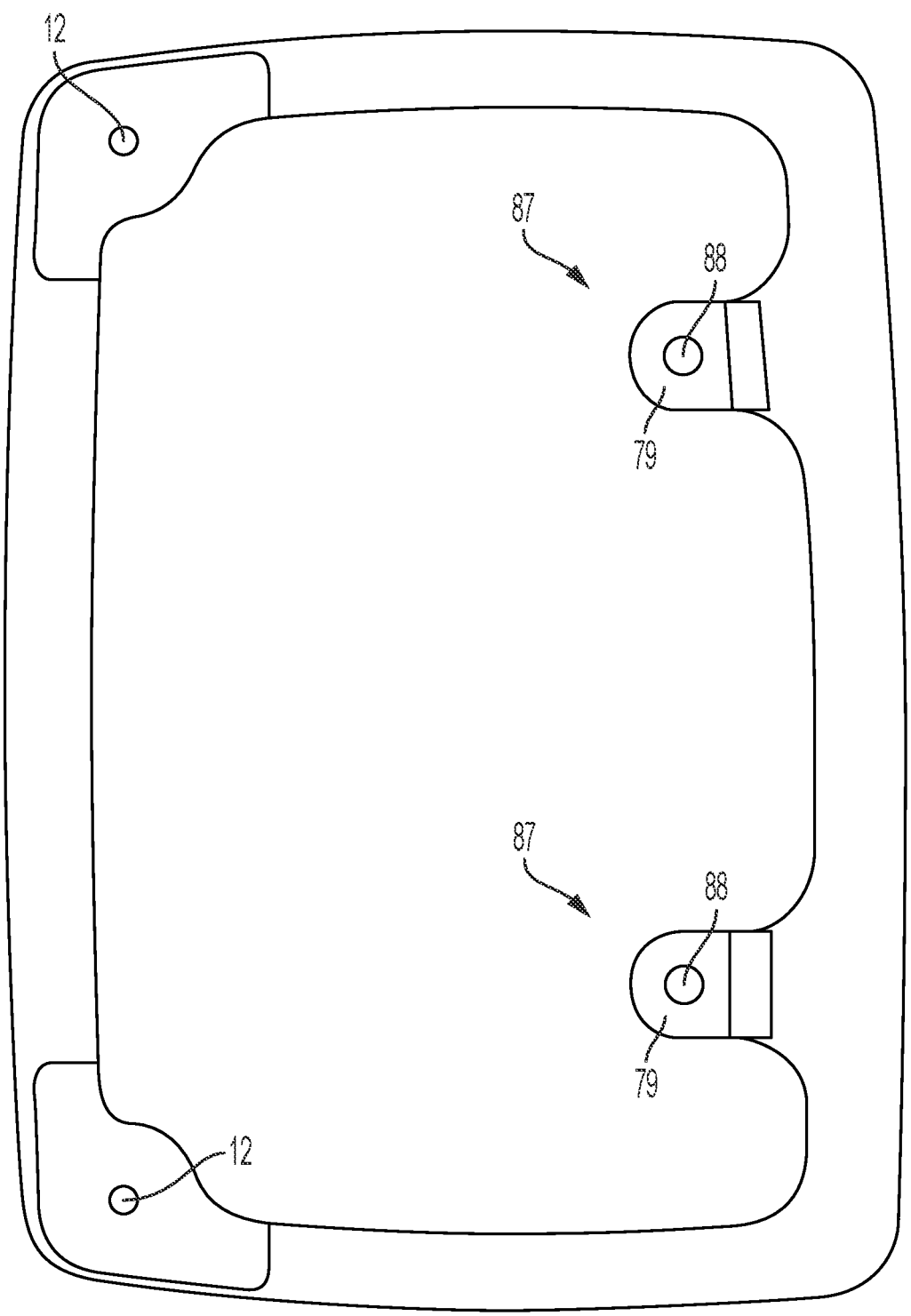
FIG. 11 is a front elevation view of the light housing shown in FIG. 8.
Figure 12:
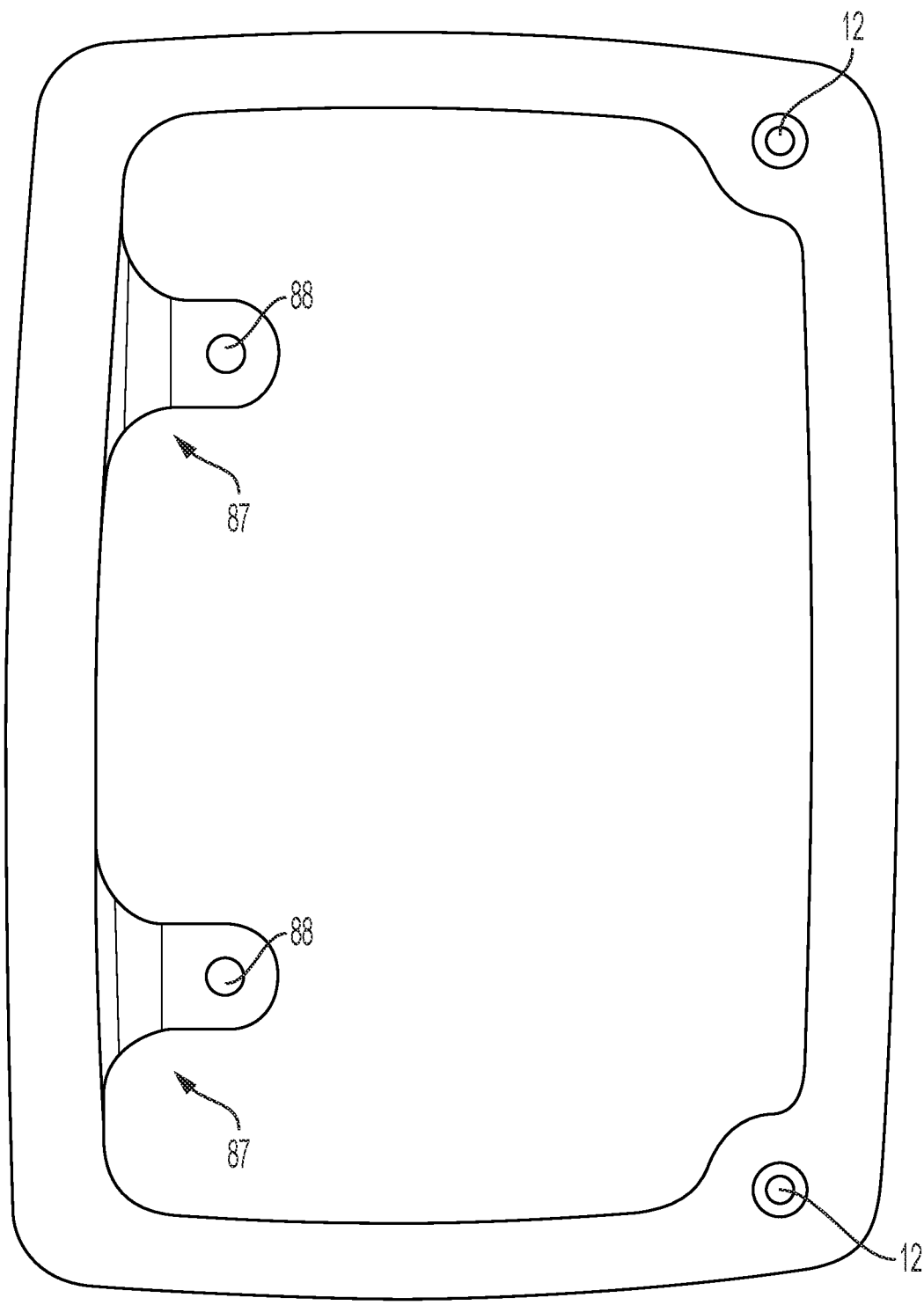
FIG. 12 is a rear elevation view of the light housing shown in FIG. 8.
Figure 13:
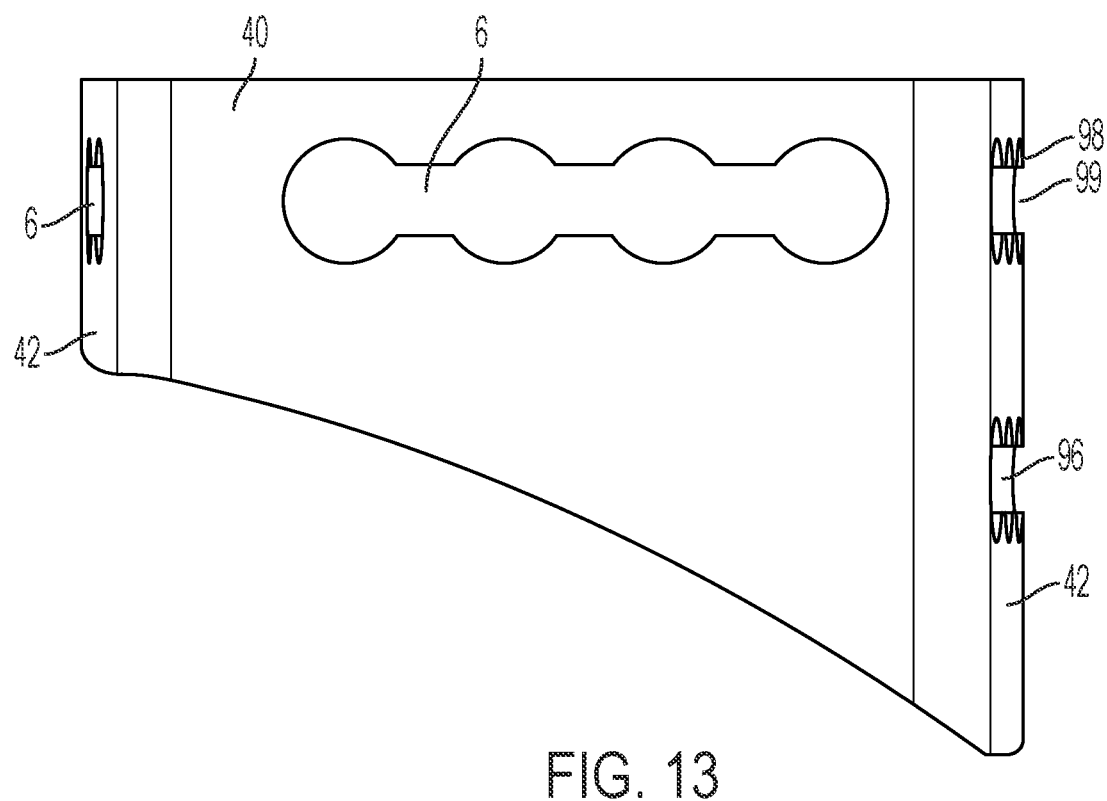
FIG. 13 is a top elevation view of the light housing shown in FIG. 8, with the bottom elevation view being a mirror image thereof.
Figure 14:
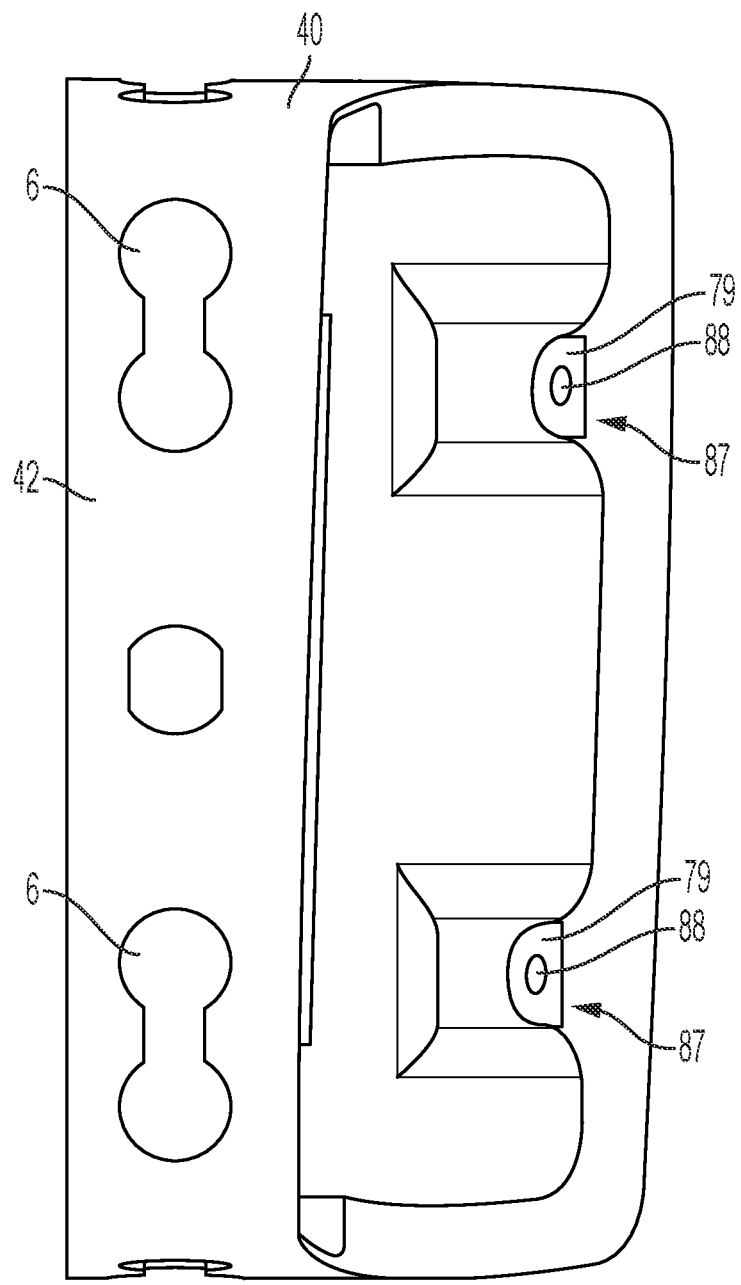
FIG. 14 is a side elevation view of the light housing shown in FIG. 8, with the opposing side elevation view being a mirror image thereof.
Figure 15:
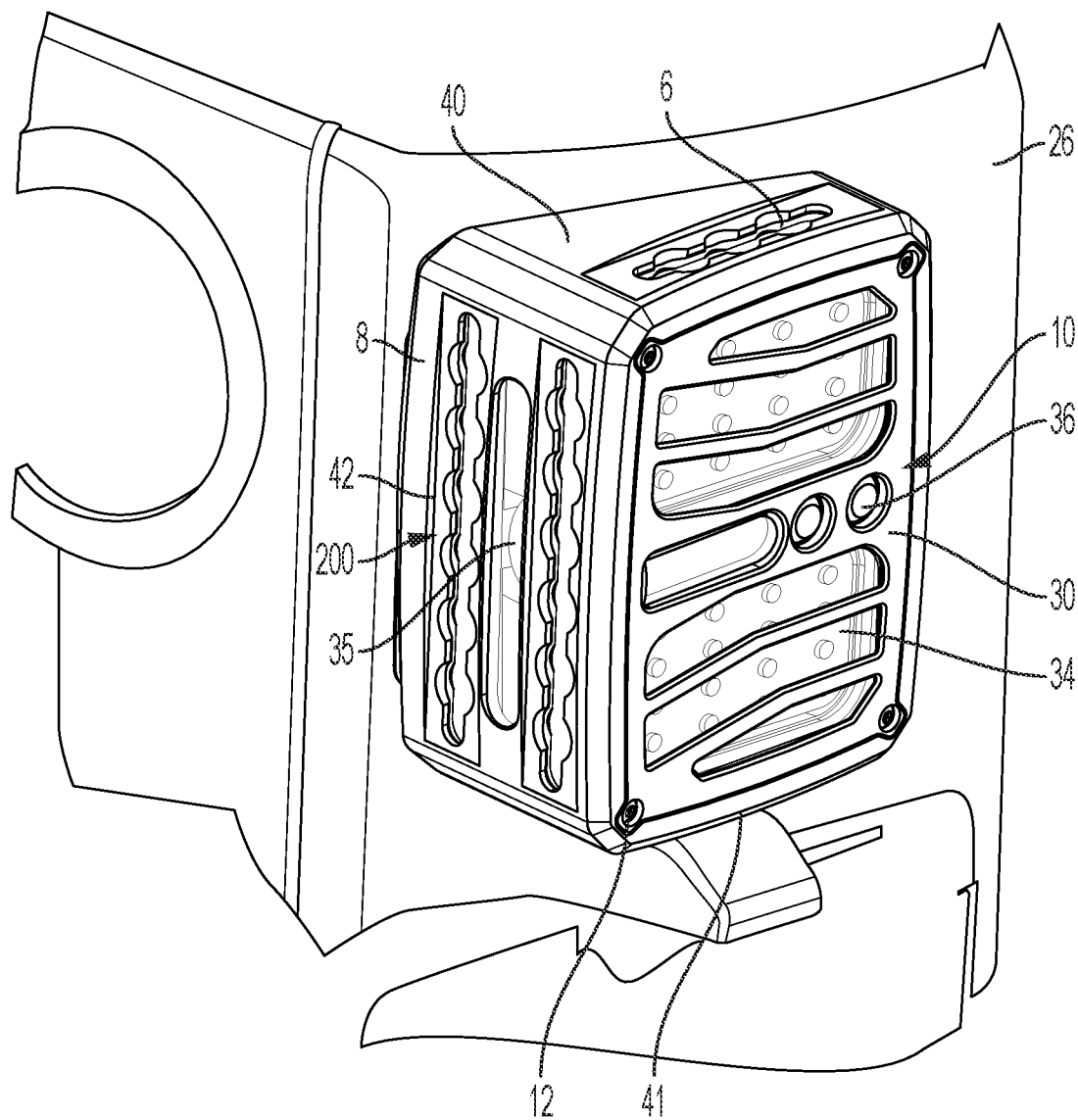
FIG. 15 is a partial cutaway, perspective view of an example of a vehicle light assembly attached to a vehicle using a clamping assembly in accordance with an illustrative embodiment of the invention disclosed herein.
Figure 16:
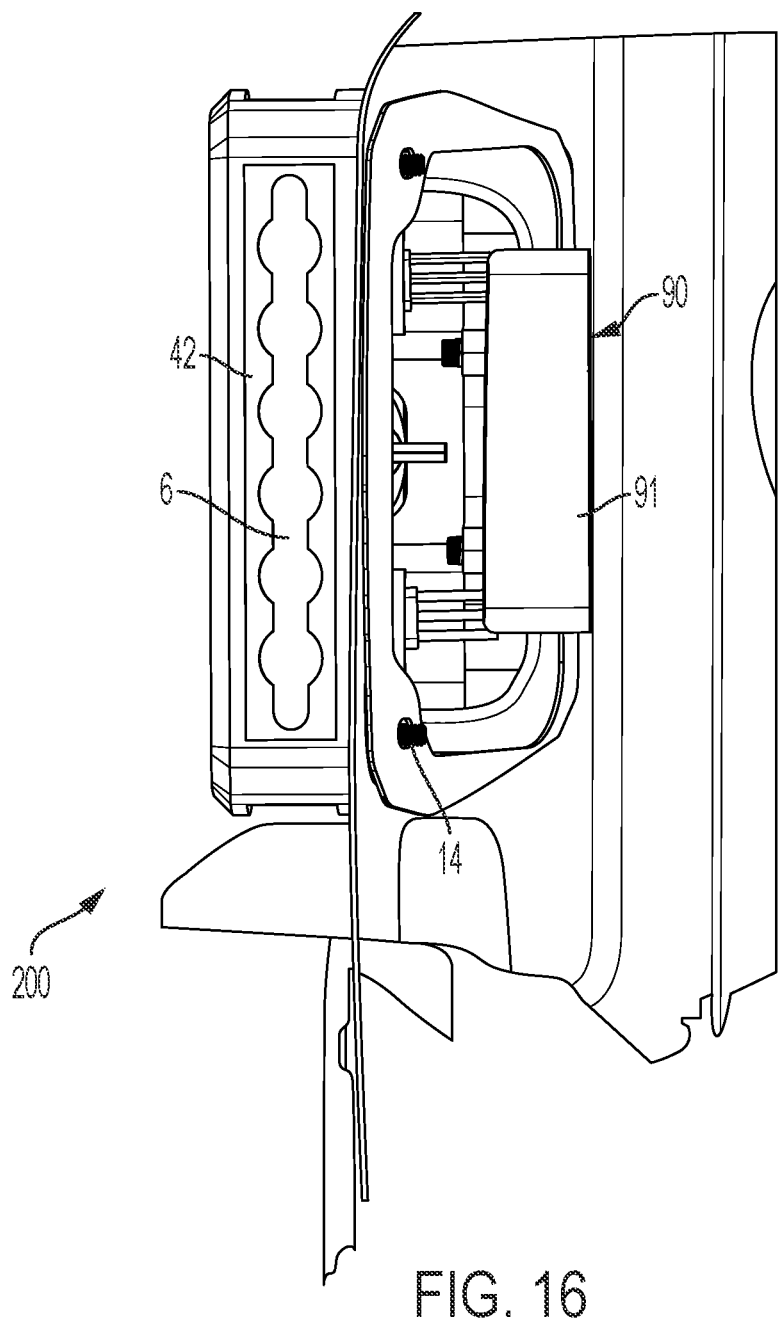
FIG. 16 is a side, partial cutaway elevation view of the vehicle light assembly shown in FIG. 15.
Figure 17:
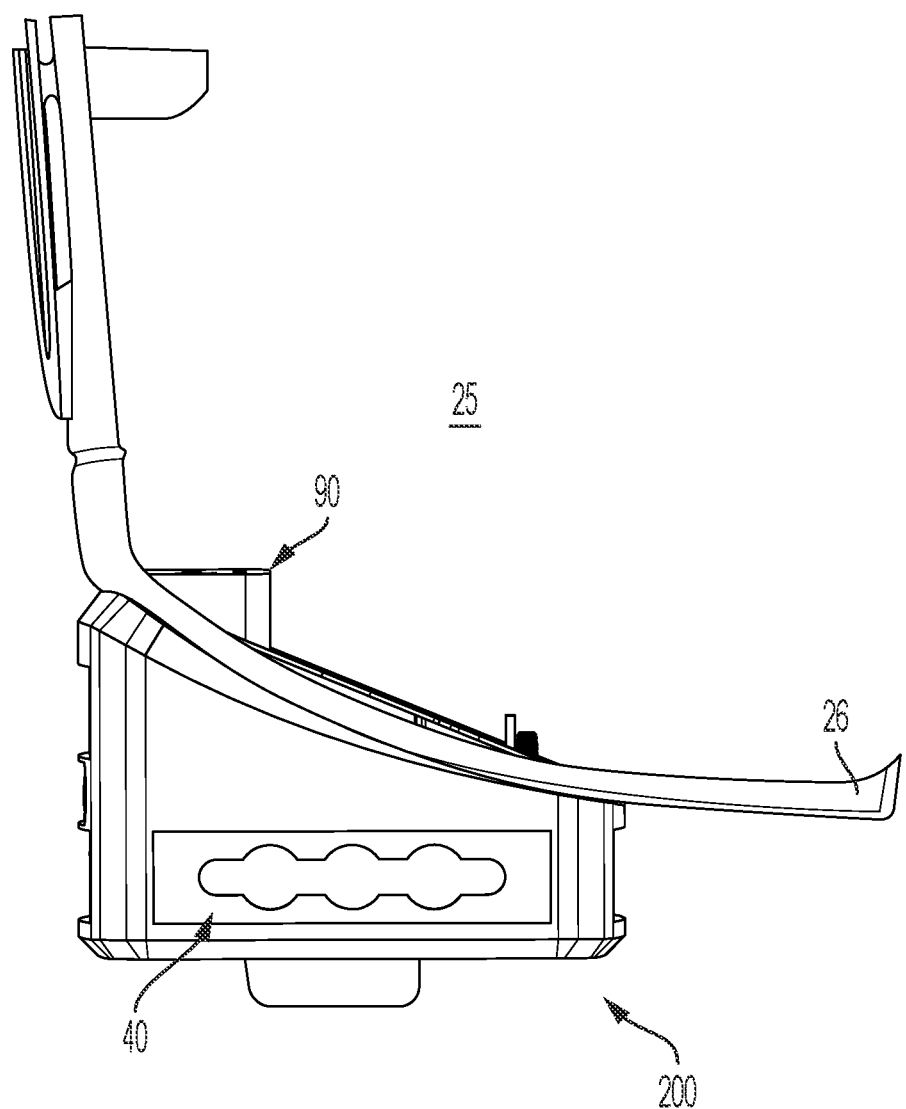
FIG. 17 is a top, partial cutaway elevation view of the vehicle light assembly shown in FIG. 15.
Figure 18:
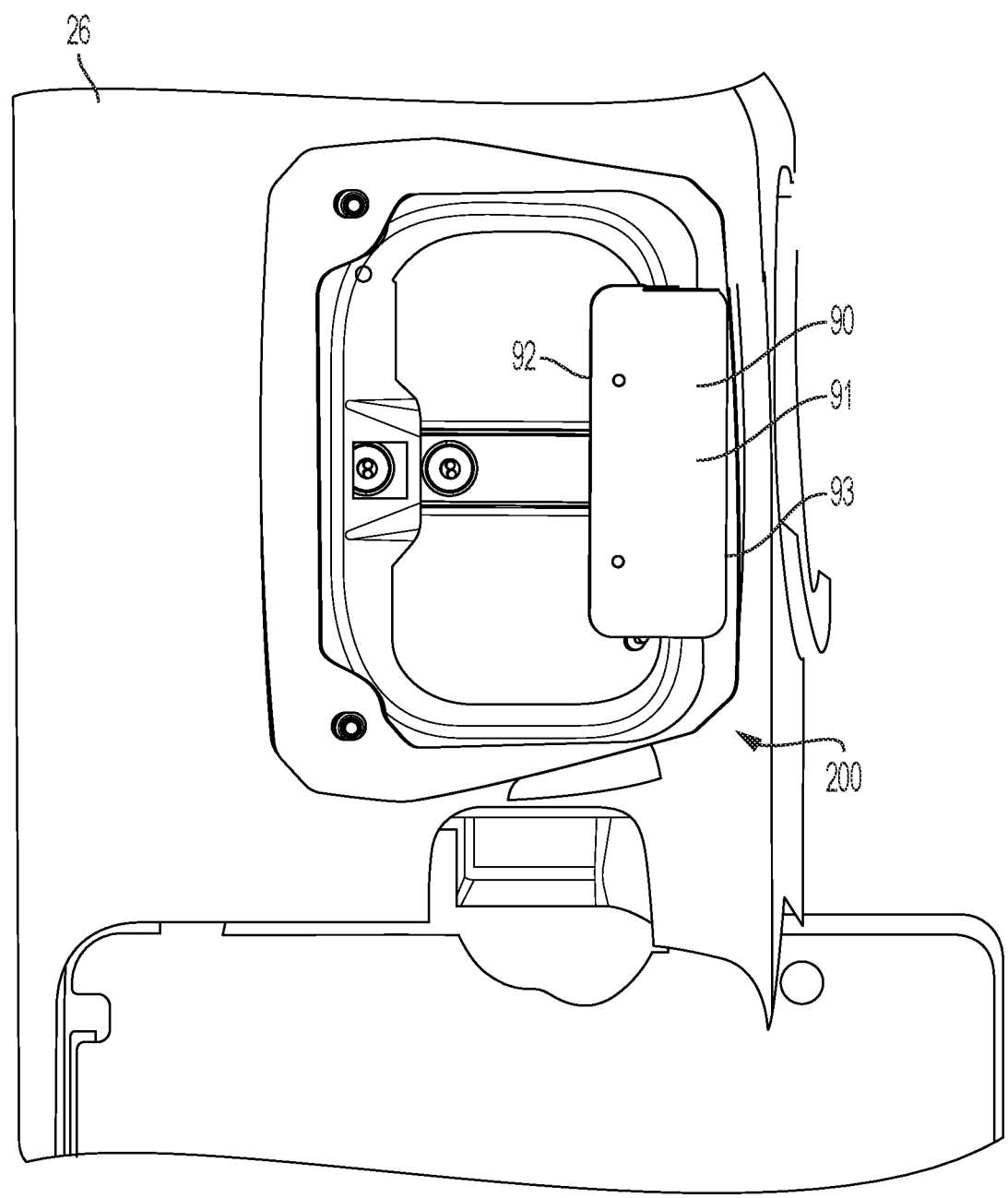
FIG. 18 is an interior, partial cutaway elevation view of the vehicle light assembly shown in FIG. 15.
Figure 19:
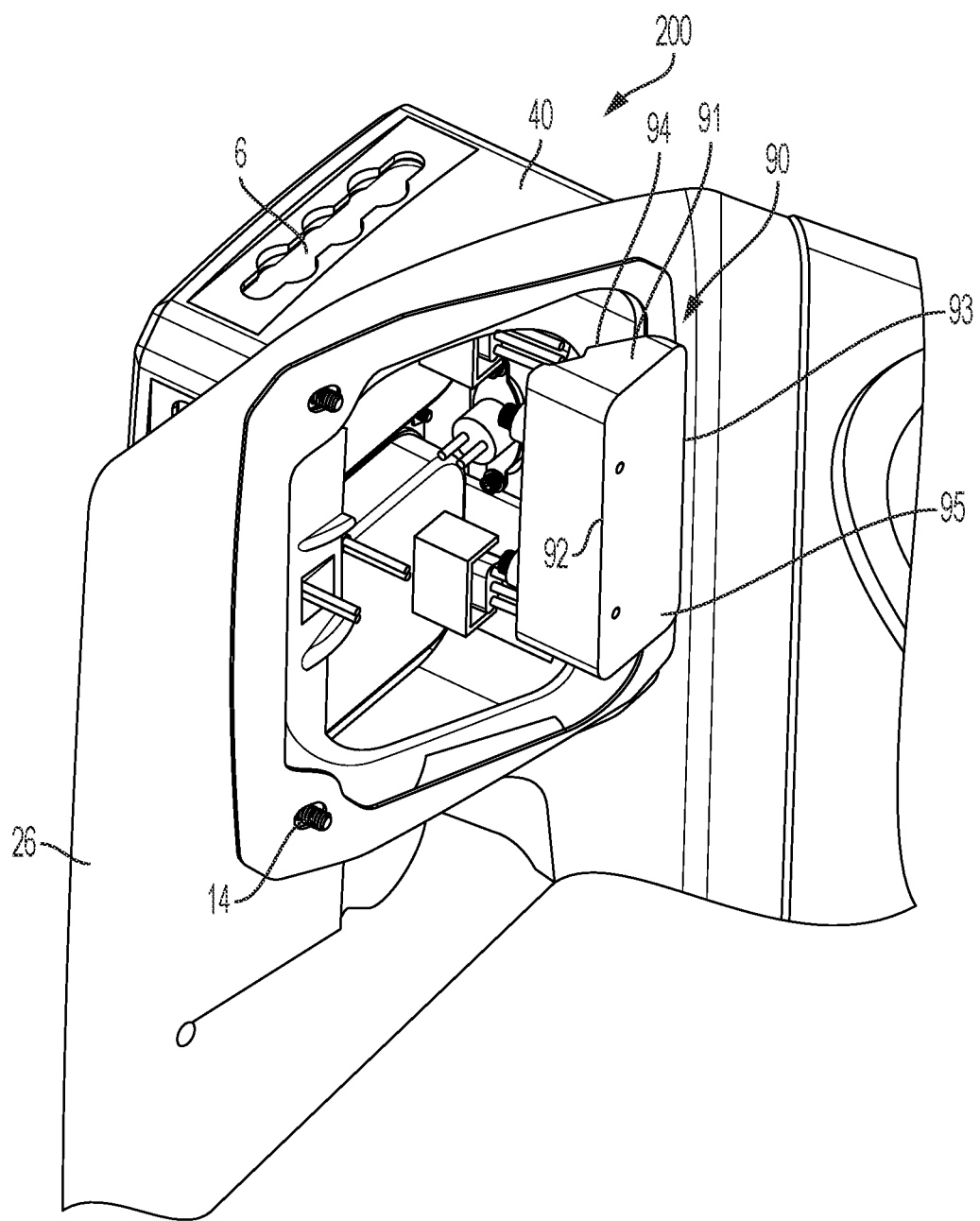
FIG. 19 is an interior partial cutaway, perspective view of the vehicle light assembly shown in FIG. 15.
Figure 20:
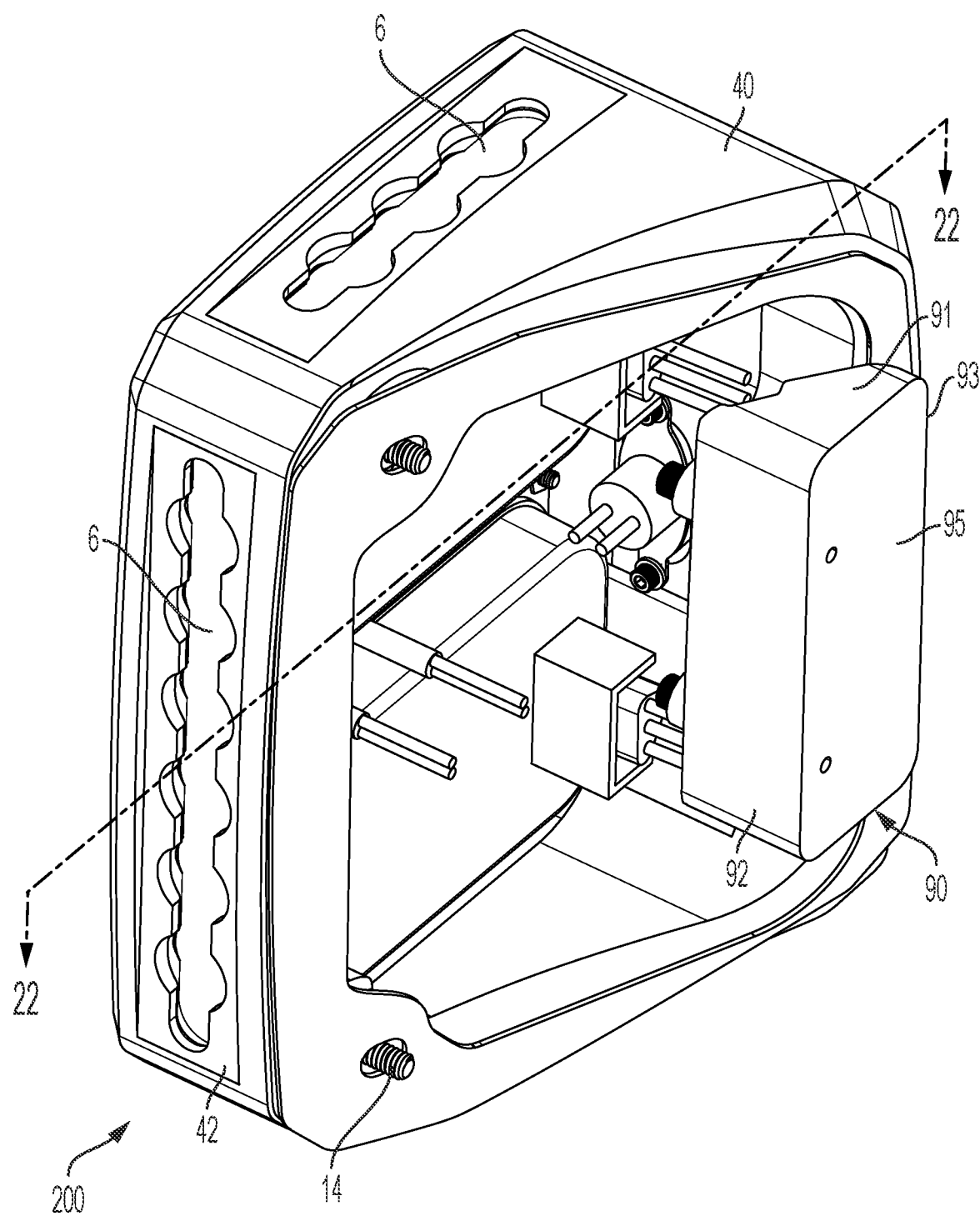
FIG. 20 is a perspective view of the vehicle light assembly having the clamping assembly shown in FIG. 15.
Figure 21:
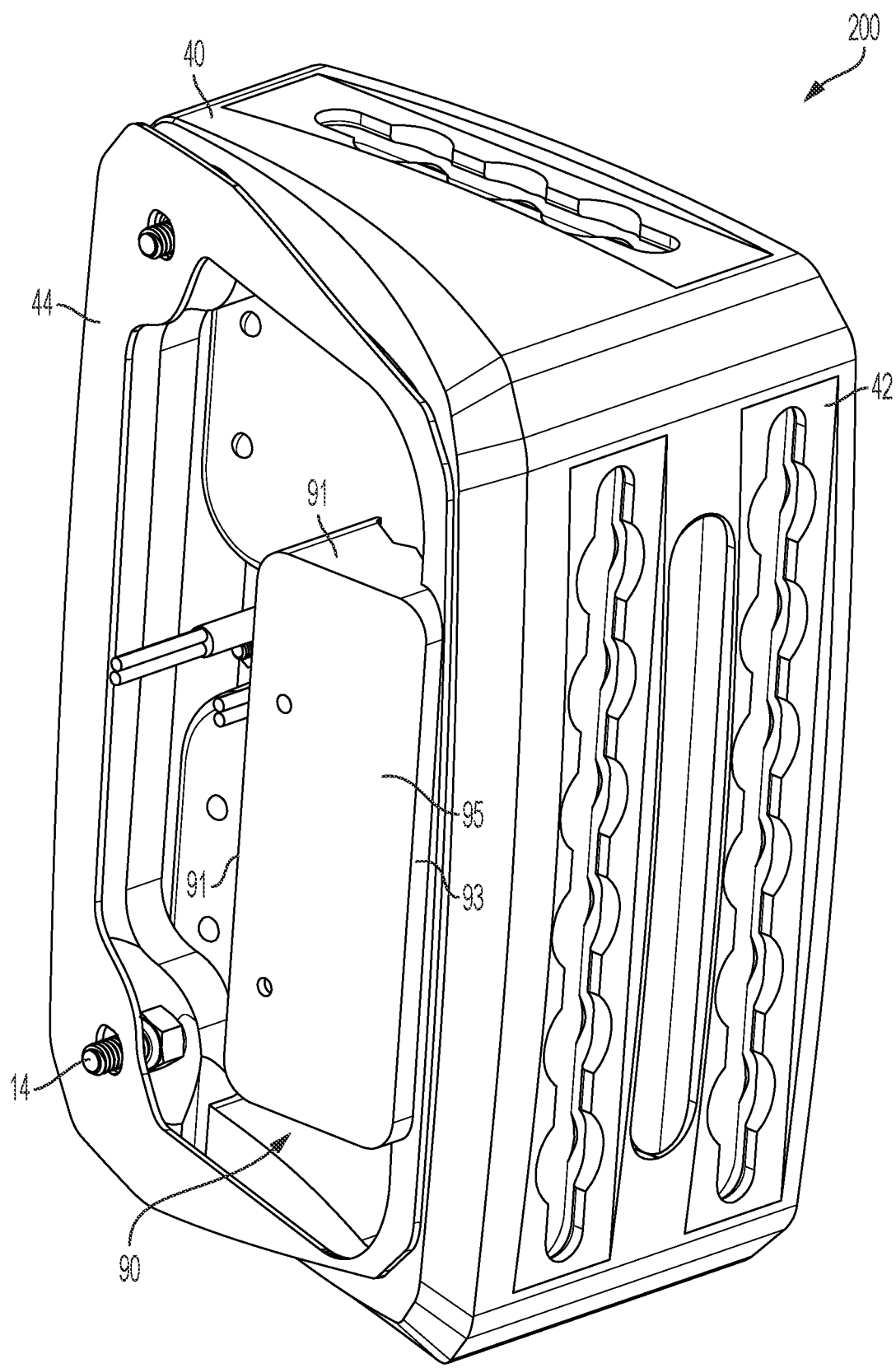
FIG. 21 is another perspective view of the vehicle light assembly having the clamping assembly shown in FIG. 15.

As shown in FIGS. 7A and 7B, the light housing assembly 200 can further include an accessory housing case 22, e.g., a handgun case, for removably mounting the accessory 23 within the light and mounting assembly 100. The housing case 22 is configured to slide into and be retained by guide slots 24 within the interior compartment 33 of the light housing 8. When attached to a vehicle, the accessory housing case 22 passes into a vehicle body cavity 25.

Referring now to FIGS. 8-14, the light housing 8 is milled as a unitary light housing 8 having a top exterior surface 40, a bottom exterior surface 41, side exterior surfaces 42, a front exterior surface 43, and a rear exterior surface 44. The light housing 8 has a plurality of seat track mounting rails 6 to which one or more accessories are removably attached, allowing moving or removing of the accessories quickly simply by removing them from the seat tracks as needed. The seat track mounting rails 6 are milled or otherwise formed directly into the unitary light housing 8. The seat track mounting rails 6 can be a single seat track mounting rail 6, such as on the top surface 40, or can be two or more parallel seat track mounting rails 6, such as on the side surface 42 of the unitary light housing 8. The profiles or cross-sections of the seat track mounting rails 6 are described in detail below; however, it is appreciated that any number of mounting rails 6 cross-sections could be used without varying from the scope of the invention. The mounting rails 6 can have a generally U-shaped cross-section that is defined by a horizontal lower portion 96 extending laterally between upstanding outer side walls 97. The mounting rails 6 can also have a generally C-shaped cross-section that further includes horizontal upper portions 98 respectively extending laterally from each of the upstanding outer side walls 97 forming a channel 99 therein.

As shown in FIGS. 8-23, the light assembly 200 can be removably secured to the rear end of the vehicle, such as by using a clamping assembly 90. The clamping assembly 90 is advantageously configured to prevent deformation and/or damage (such as to the body panel, the side panel, or the paint of the vehicle) when a load is applied to the light assembly 200. As illustrated, the clamping assembly 90 includes one or more angled housing fingers 87 that are integrated into the light housing 8 and a mounting block 91. Each housing finger 87 has an angled contact surface 79 and an aperture 88 that corresponds to a mounting block aperture 89, such that a screw or other suitable fastener 61 may be extended through the aperture 88 and the corresponding mounting block aperture 89. In some embodiments, a shim or washer is used between the housing fingers 87 and the mounting block 91 to limit the rotation of the mounting block 91 or the fastener 61.

Figure 22:
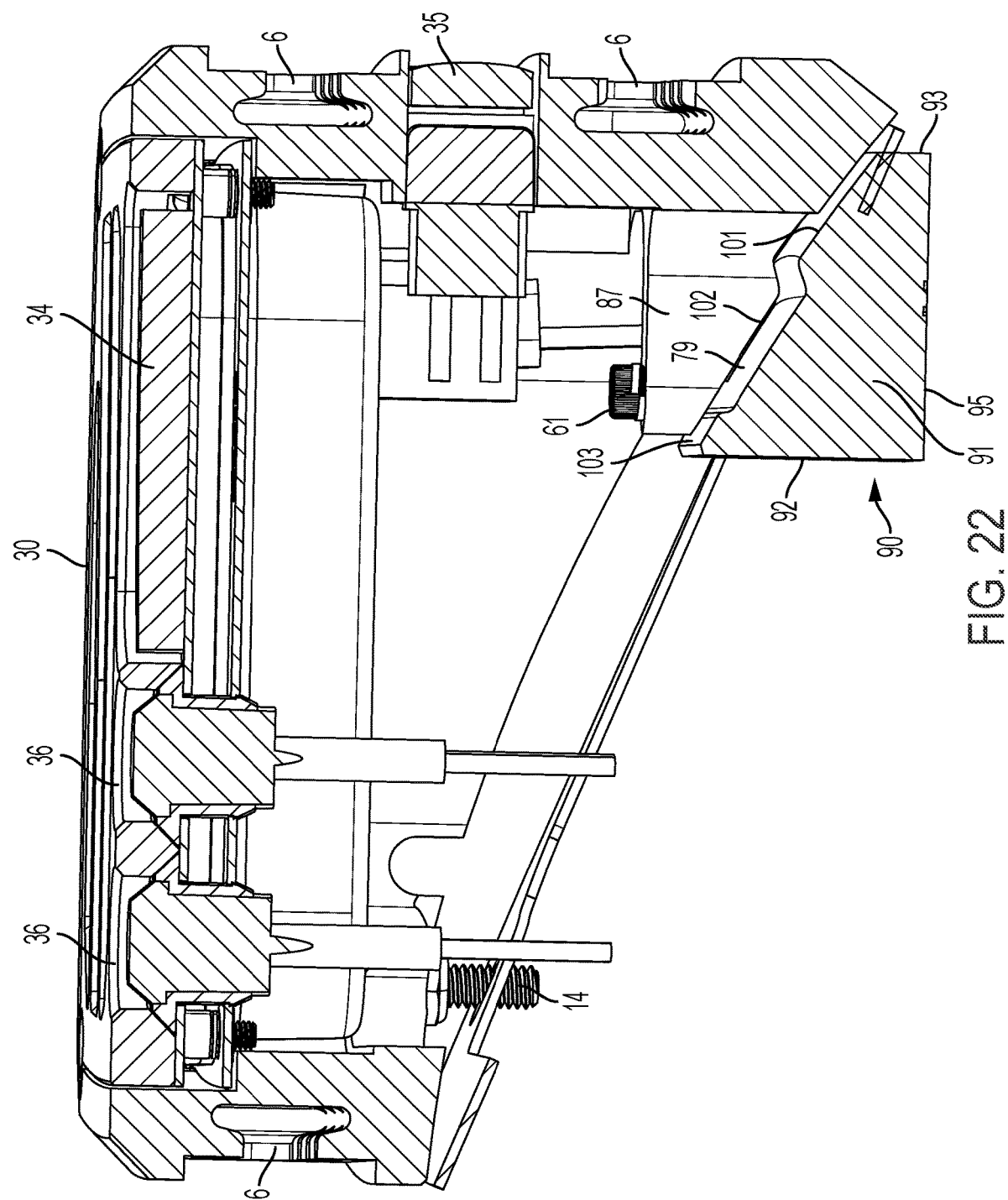
FIG. 22 is a cross-sectional view along line 22-22 shown in FIG. 20.
Figure 23:
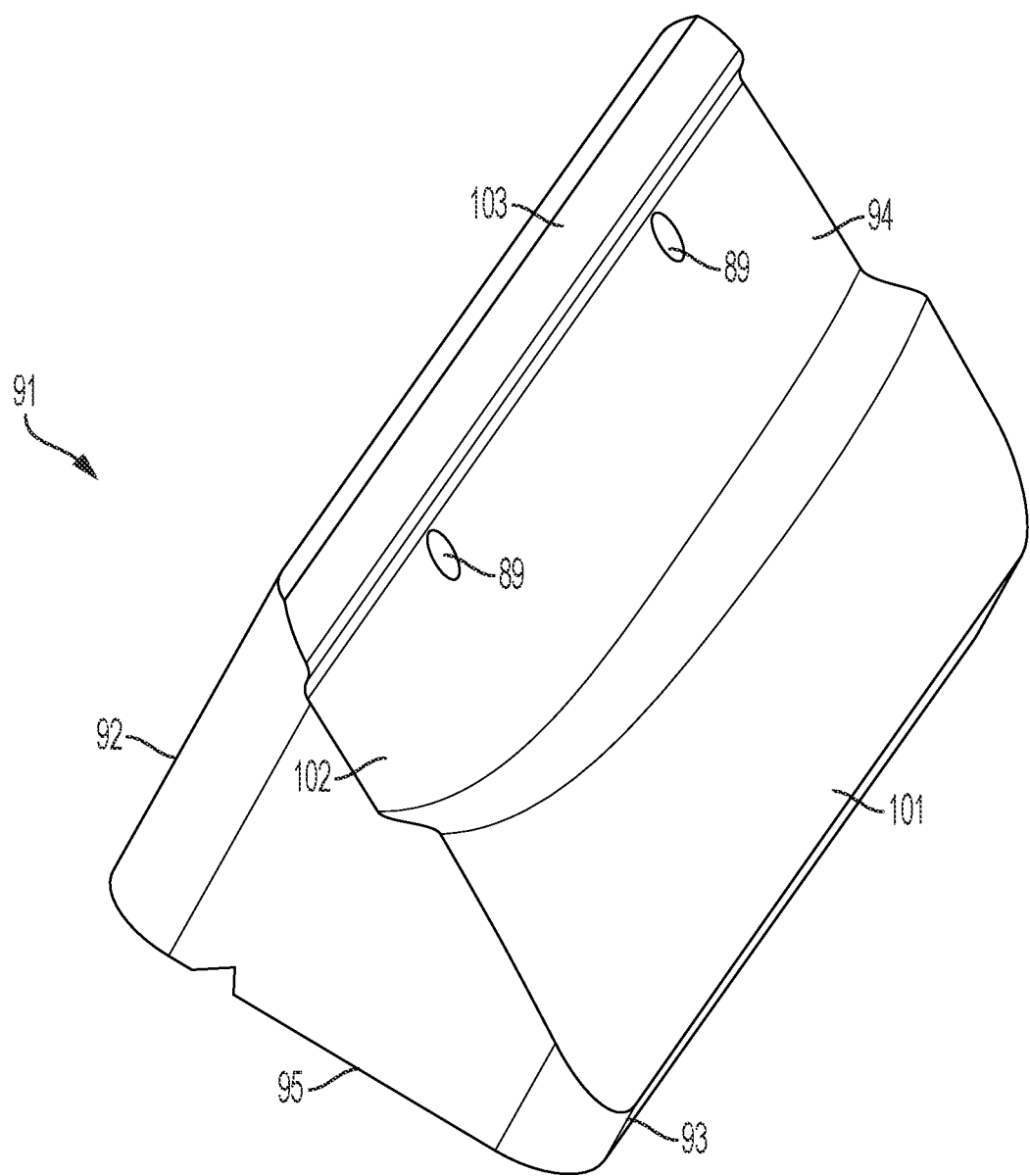
FIG. 23 is a perspective view of an example of a mounting block of a clamping assembly in accordance with an illustrative embodiment of the invention disclosed herein.
Figure 24:
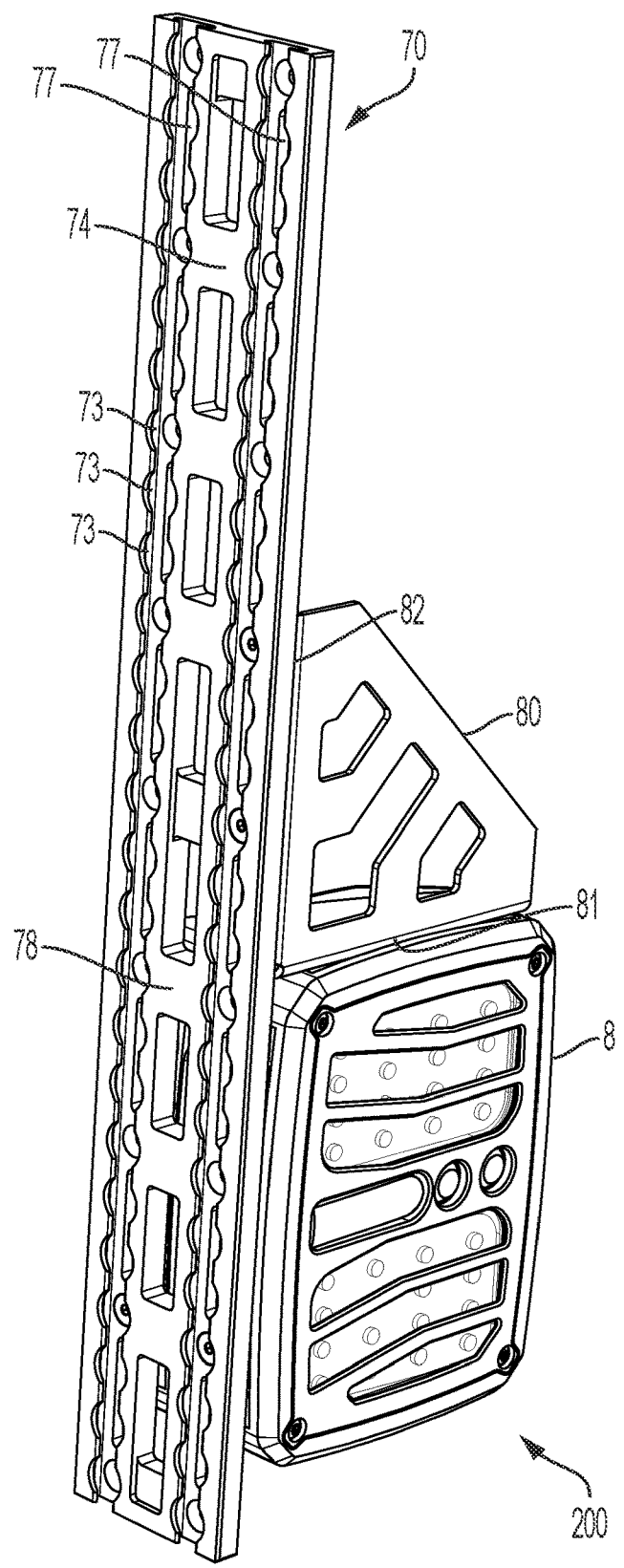
FIG. 24 is a perspective view of a vehicle light assembly with an example of a seat track rail mounting assembly in accordance with an illustrative embodiment of the invention disclosed herein.
Figure 25:
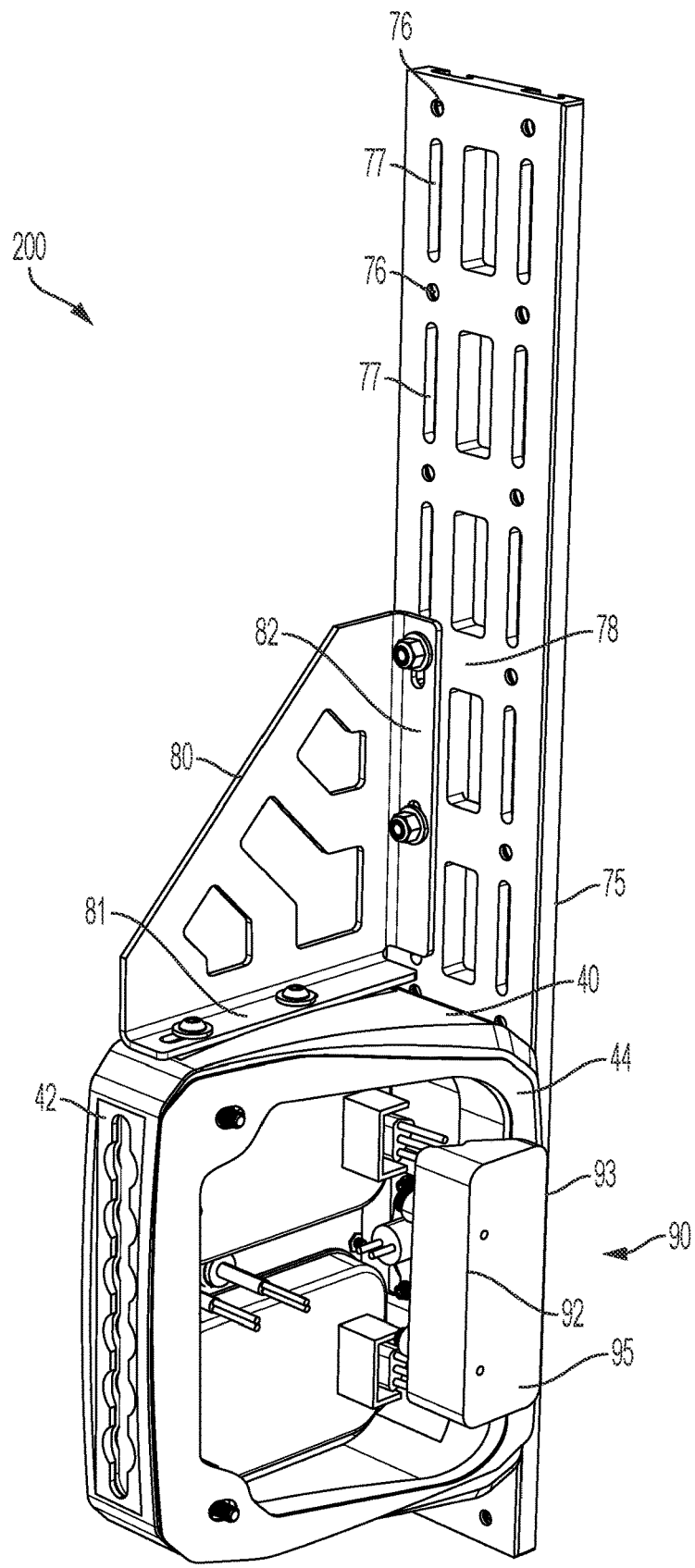
FIG. 25 is an interior perspective view of the vehicle light assembly having the seat track rail mounting assembly shown in FIG. 24.
Figure 26:
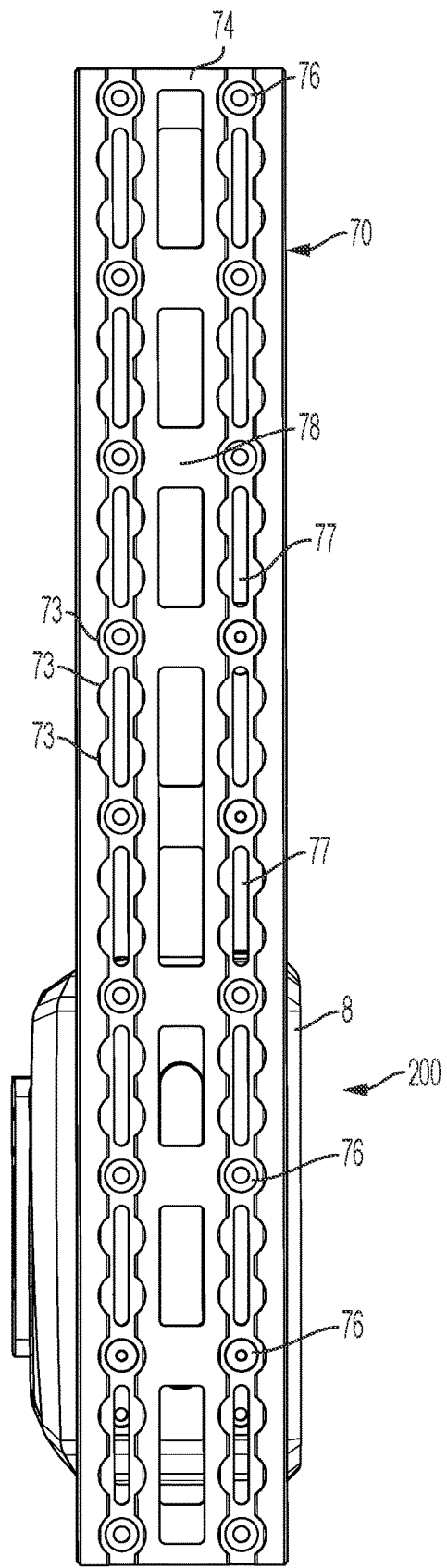
FIG. 26 is a side elevation view of the vehicle light assembly having the seat track rail mounting assembly shown in FIG. 24.
Figure 27:
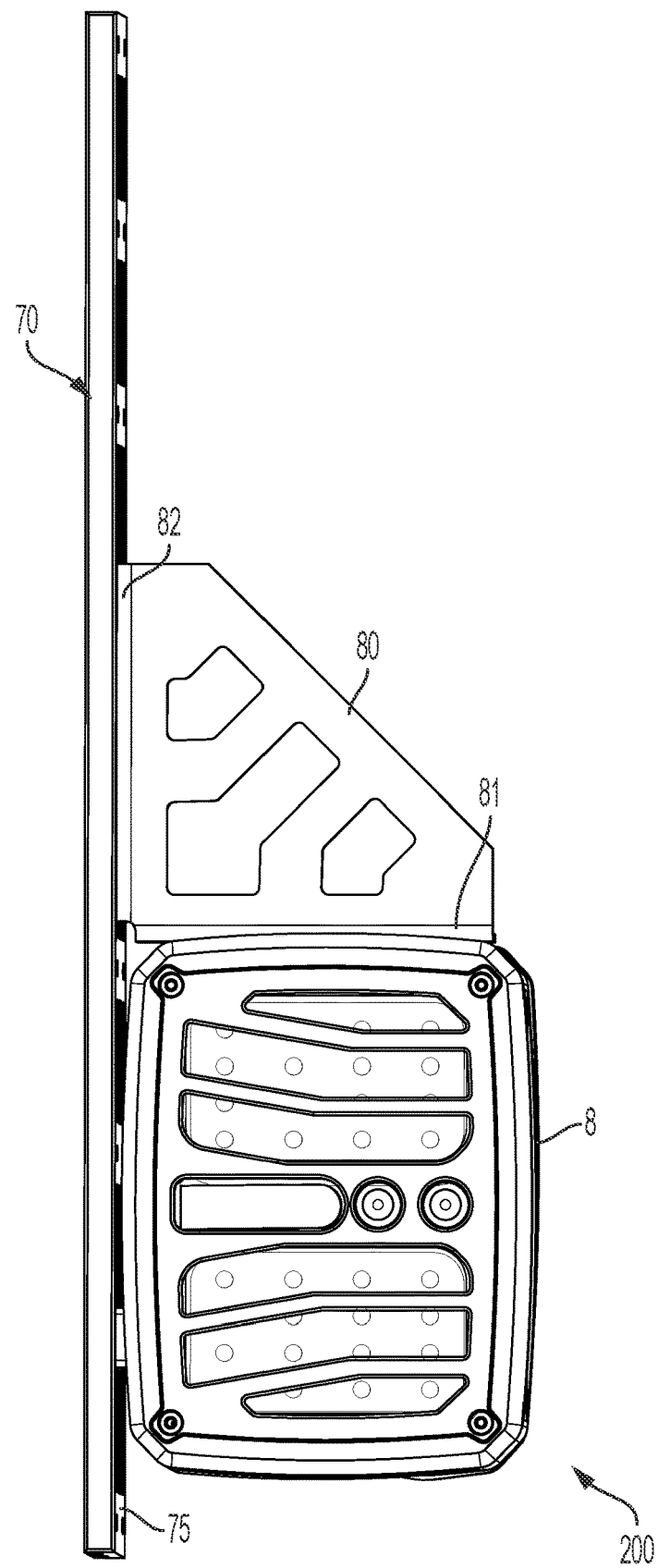
FIG. 27 is a front elevation view of the brake light housing having the seat track rail mounting assembly shown in FIG. 24.
Figure 28:
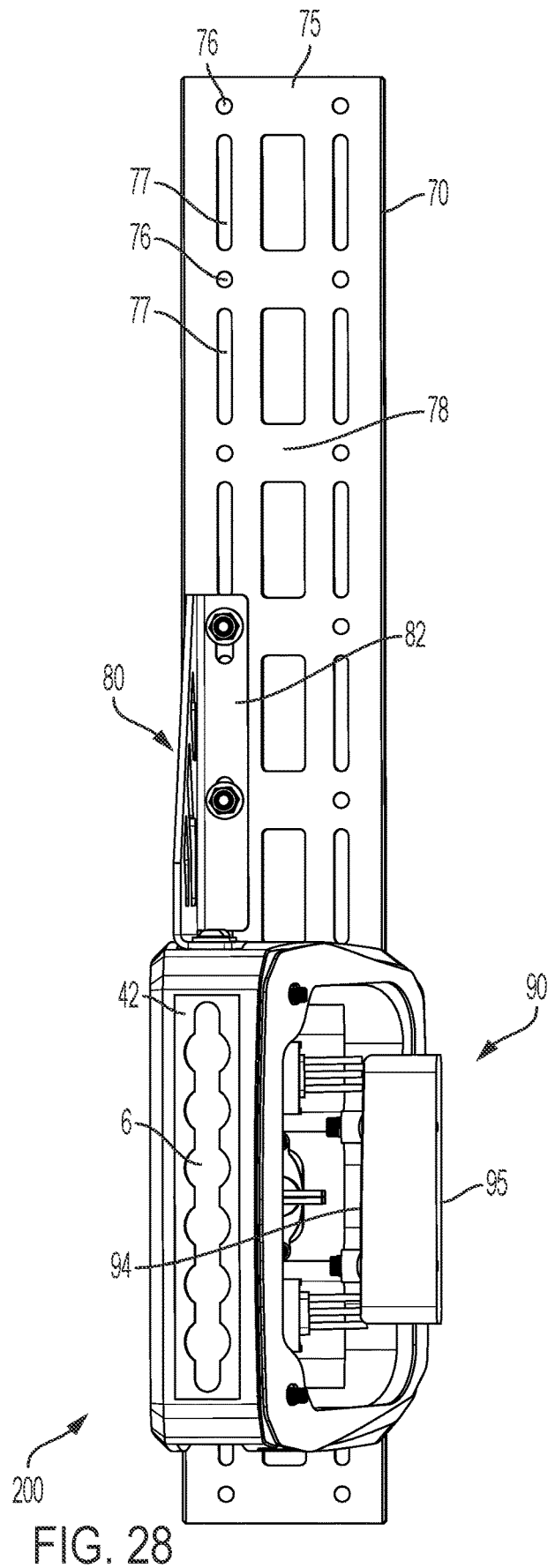
FIG. 28 is another side elevation view of the vehicle light assembly having the seat track rail mounting assembly shown in FIG. 24.
Figure 29:
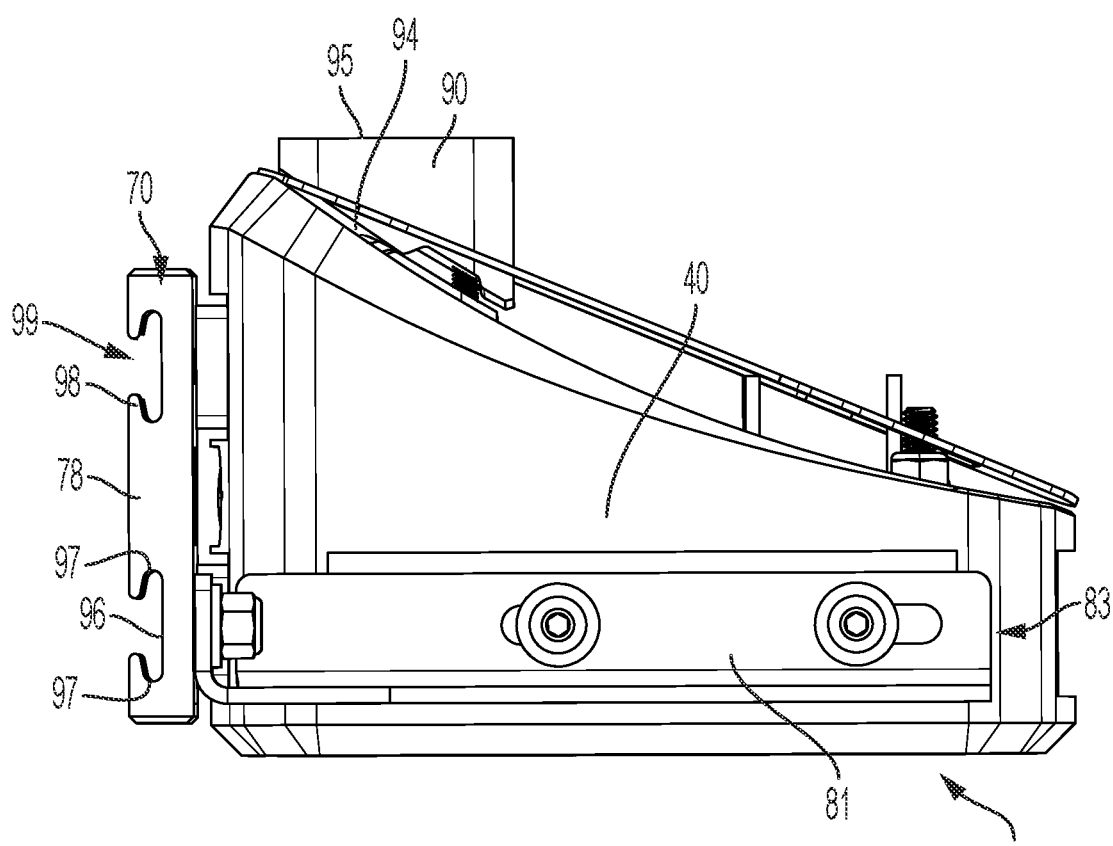
FIG. 29 is a top elevation view of the vehicle light assembly having the seat track rail mounting assembly shown in FIG. 24.
Figure 30:
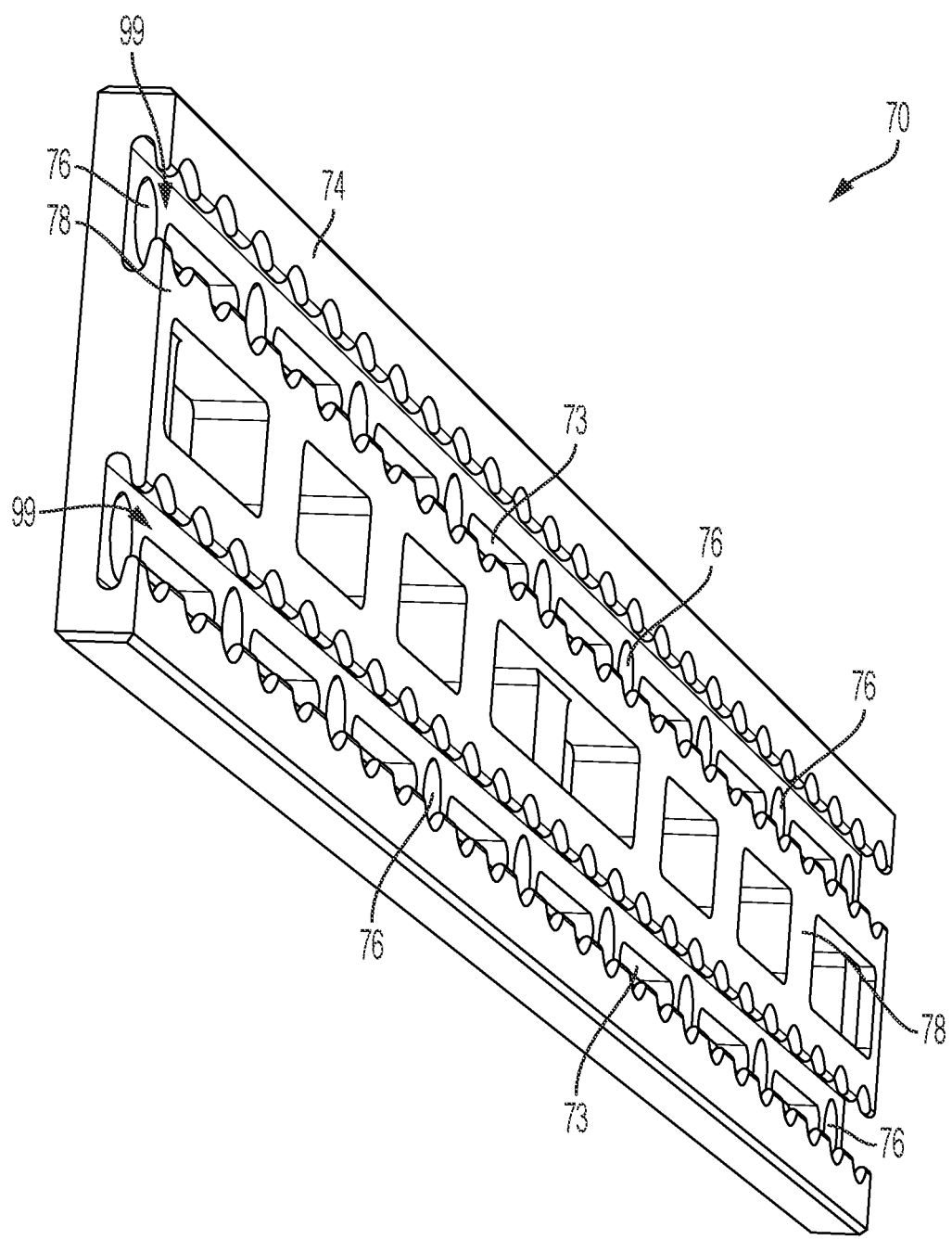
FIG. 30 is a perspective view of an example of a seat track rail mounting assembly in accordance with an illustrative embodiment of the invention disclosed herein.
Figure 31:
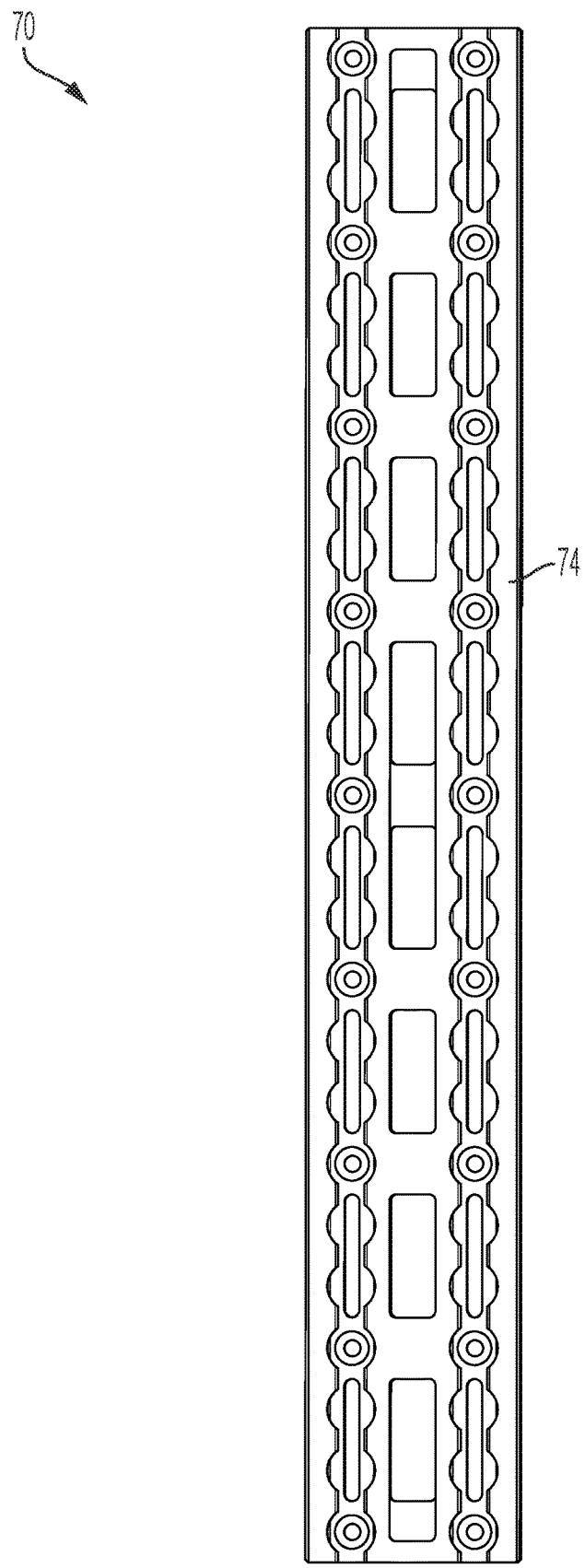
FIG. 31 is a front elevation view of the seat track rail mounting assembly shown in FIG. 30.
Figure 32:
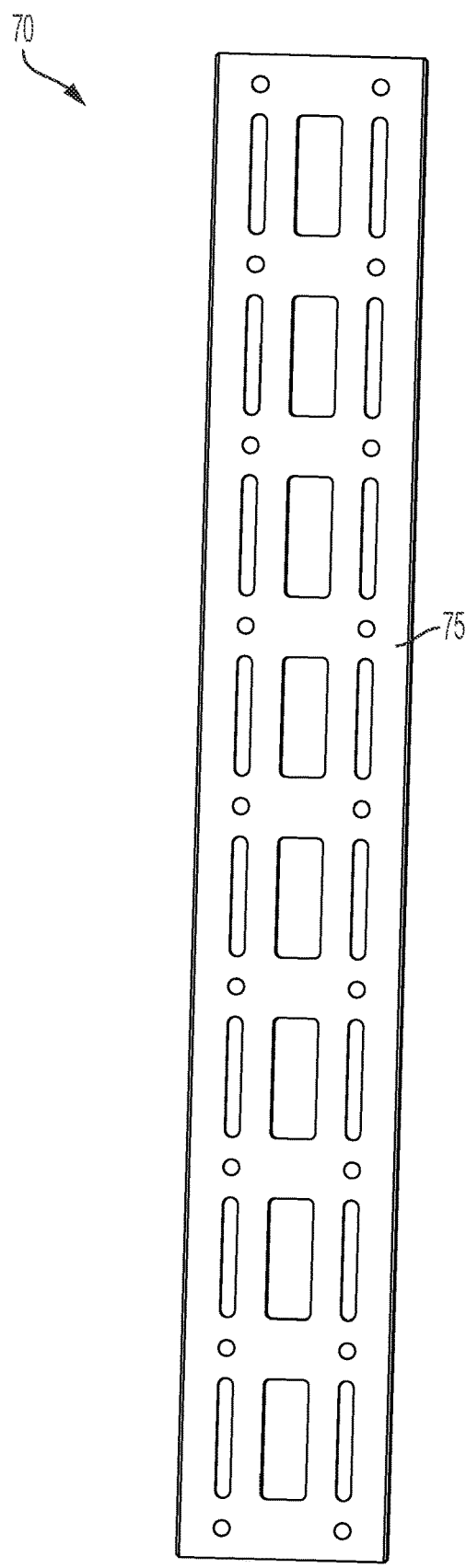
FIG. 32 is a rear elevation view of the seat track rail mounting assembly shown in FIG. 30.
Figure 33:
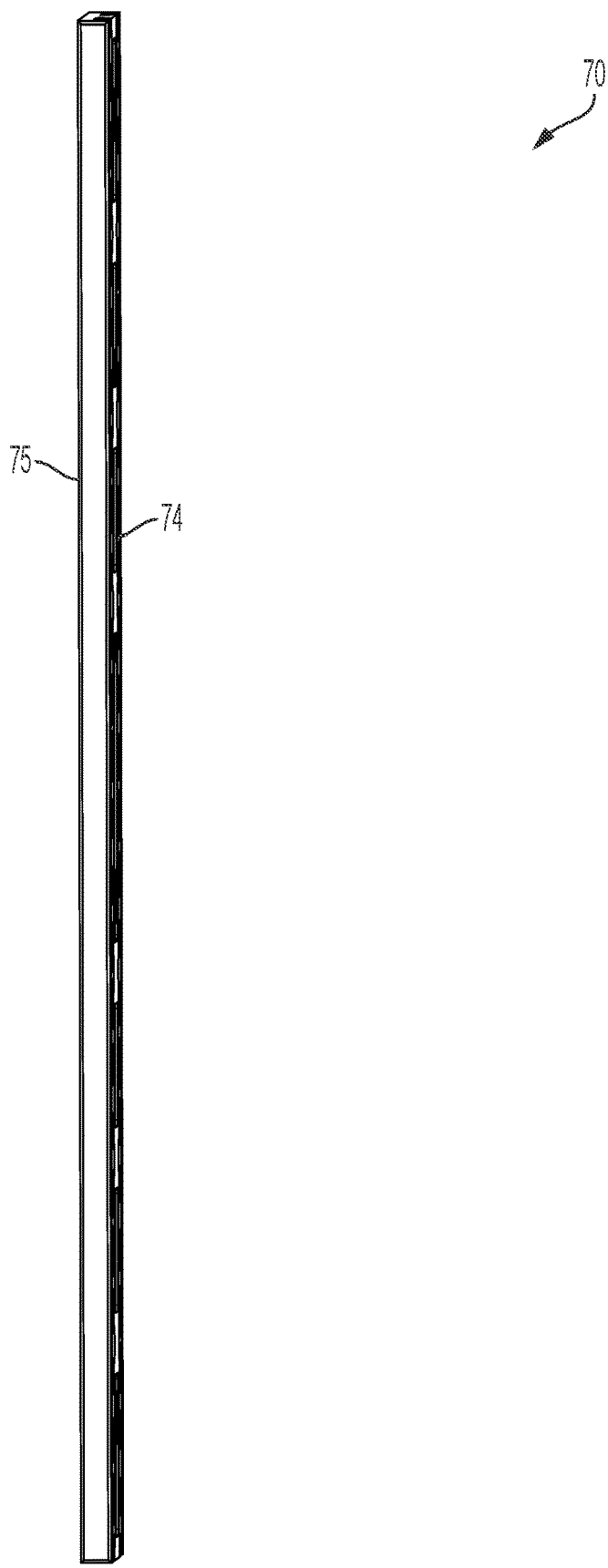
FIG. 33 is a side elevation view of the seat track rail mounting assembly shown in FIG. 30, with the opposing side elevation view being a mirror image thereof.
Figure 34:
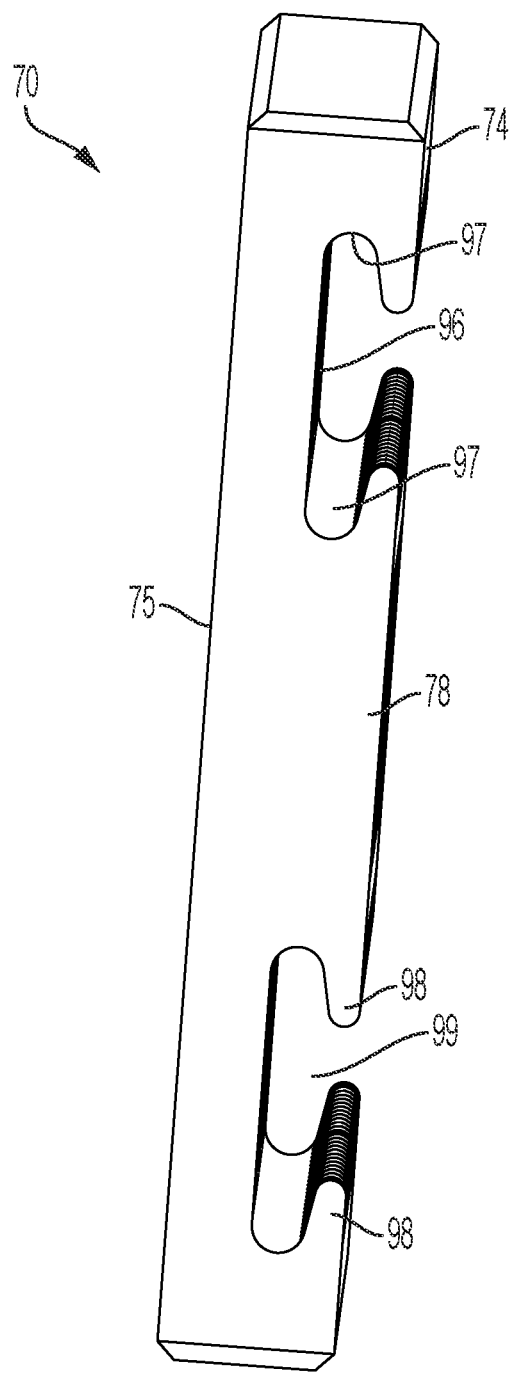
FIG. 34 is a top elevation view of the seat track rail mounting assembly shown in FIG. 30, with the opposing bottom elevation view being a mirror image thereof.
Figure 35:
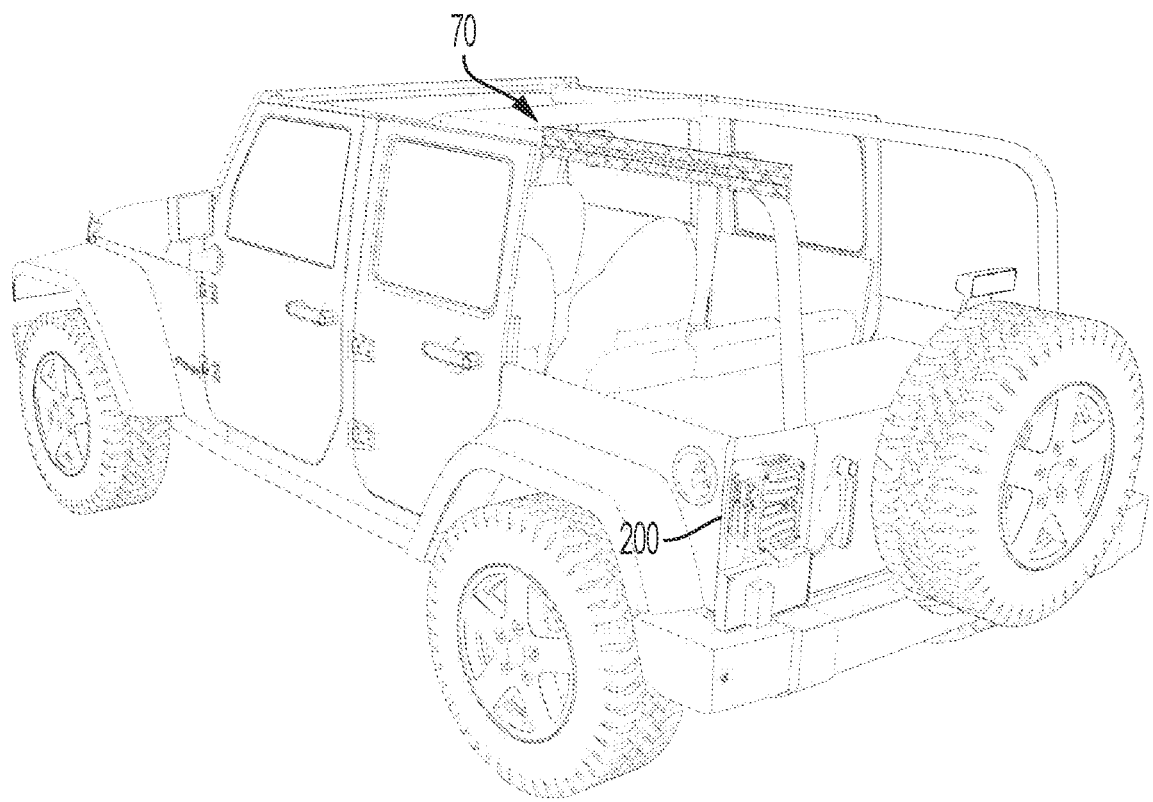
FIG. 35 is a perspective view of an example of a vehicle light assembly and a seat track mounting assembly in accordance with an illustrative embodiment of the invention disclosed herein.

As shown in FIGS. 22 and 23, the mounting block 91 of the clamping assembly 90 has a first end 92, a second end 93 disposed opposite to the first end 92, an inner contact surface 94, and an outer surface 95. The inner contact surface 94 of the mounting block 91 has a geometry that conforms to the angled contact surface 79 of the housing fingers and the outer radius of the body panel 26 of the vehicle. As exemplified in FIGS. 22 and 23, the inner contact surface 94 has a contoured ridge 101 and a terminal ridge 103, forming an intermediate contoured channel 102.

In use, the clamping assembly 90 is positioned such that a portion of the body panel 26 of the vehicle is disposed between the rear surface 44 of the light housing 8 and the inner contact surface 94 of the mounting block 91, which is placed interior to the light assembly 200 within the vehicle body cavity 25. The clamping assembly 90 is clamped tightly between the rear surface 44 of the light housing 8 and inner contact surface 94 of the clamping assembly 90 when a screw or other suitable fastener is extended through apertures 88, 89 in the channel 102 of the inner contact surface 94. One or more screws 14 can be additionally applied through one or more corresponding screw apertures 12 to secure the light housing assembly 200 to the vehicle body.

As illustrated in FIGS. 24-29, a seat track mounting assembly 70 may be removably attached to an exterior side surface 42 of the light housing 8. The position of the seat track mounting assembly 70 relative to the light housing 8 can be adjusted by removably securing a portion of the seat track mounting assembly 70 further up or down the light housing 8. The seat track mounting assembly 70 can be removably secured to the light housing 8 using one or more screws, bolts, magnets, or other suitable fasteners, each placed through mounting assembly apertures 76 and each mounting assembly aperture 76 being in the center of one of the longitudinally spaced apart holes 73 of the seat track rails 71. By way of example, a mounting assembly aperture 76 may be disposed in the center of every third hole 73 on the seat track rail 71, and a separate longitudinal aperture 77 is disposed on the seat track rail 71 in a position between consecutive third holes 73 containing a mounting assembly aperture 76. The length of the longitudinal aperture 77 can span a distance that overlaps with the two holes 73 between consecutive third hole 73 containing a mounting assembly aperture 76. In other embodiments, the mounting assembly apertures 76 and longitudinal apertures 77 of the seat track rail 71 are disposed at different frequencies along the seat track rail 71, e.g., a mounting assembly aperture 76 is disposed in the center of every second hole 73 with a longitudinal aperture 77 disposed in a position between consecutive second holes 73. By further way of example, the seat track mounting assembly 70 may be removably secured to the light housing 8 using only two fasteners, each placed through mounting assembly apertures 76. In another example, the seat track mounting assembly 70 may be removably secured to the light housing 8 using four fasteners. However, it is appreciated that any number of fasteners could be used, up to the number of available mounting assembly apertures 76, without varying from the scope of the invention.

A support brace 80 may be used to stabilize and secure the seat track mounting assembly 70 to the light housing 8. In an illustrative embodiment, the support brace 80 has a first arm 81 and a second arm 82 extending away from the first arm 81 at an approximate ninety-degree angle. The support brace 80 can be removably secured to the light housing 8 by attaching the first arm 81 to the top exterior surface 40 of the light housing 8 using a suitable connection means, such as one or more screws, bolts, or magnets. The support brace 80 can be removably secured to the seat track mounting assembly 70 by attaching the second arm 82 to the rear exterior surface 72 of the seat track mounting assembly 70 using one or more screws, bolts, magnets, or other suitable fasteners, each placed through a mounting assembly aperture 76.

The seat track mounting assembly 70 can have one or more seat track rails 71, which may not be integrated into a single piece but function together. In the exemplified embodiment in FIGS. 30-34, the seat track mounting assembly 70 has a plurality of seat track rails 71, which are integrated into a single unitary piece and oriented in a parallel configuration. As illustrated in the figures, the unitary seat track mounting assembly 70 has a rectangular geometry, but the invention is not so limited; the unitary seat track mounting assembly 70 can have any geometry (e.g., square, annular) with the seat track rails 71 fabricated integrally thereon. A plurality of integrated transverse supports 78 are configured between the seat track rails 71 to provide rigidity. In some embodiments, each integrated transverse support 78 is configured with an additional mounting assembly aperture 76 at its center, providing another means for removable attachment to the light housing 8, a roll bar, or any other attachment substrate or usage desired by the end user.

An advantage of a double-seat track mounting assembly 70 shown in FIGS. 30-34 is that the double-seat track rails provide greater resistance to deflection than a single-track rail configuration. The double-seat track mounting assembly 70 can also bear more mass per foot of seat track rail 71 than the single-track rail configuration. The double-seat track rail configuration has approximately an additional 44 pounds-per-square-inch moment of inertia compared to the single-track rail configuration, i.e., approximately a 70% greater moment of inertia.

The seat track rails 71 can be configured to form an L track or an E track. It should be appreciated that although the seat track mounting assemblies 70 utilize seat track rails 71, the mounting assembly 70 in other embodiments utilizes rails configured as Picatinny rails, Weaver rails, or a combination thereof having a longitudinal body portion 76 with an upper surface 74, a lower surface 75, and spaced apart access openings 73. Each seat track rail 6 comprises a longitudinal body portion with an upper surface 74 and a lower surface 75. The two seat track rails 71 of the illustrated embodiment have a plurality of longitudinally spaced apart holes 73 extending in a transverse direction. As illustrated, the profiles or cross-sections of the seat track mounting assembly 70 have a generally C-shaped cross-section that is defined by a horizontal lower portion 96 extending laterally between upstanding outer side walls 97 and horizontal upper portions 98 respectively extending laterally from each of the upstanding outer side walls 97 forming a channel 99 therein. However, it is appreciated that any number of seat track mounting assembly 70 cross-sections could be used without varying from the scope of the invention. It should be noted that, although horizontal upper portions 98 of many thicknesses may be used for the seat track mounting assembly 70, a thicker horizontal upper portion 98 will be more effective at resisting applied stress than a thinner horizontal upper portion. Use of thicker horizontal upper portions 98 will result in a difference in angle and a decrease in overall volume for the channel 99.

The description of the invention is intended to be read in connection with the accompanying drawings, which are to be considered part of the entire written description of this invention. In the description, relative terms such as "front," "rear," "lower," "upper," "horizontal," "vertical," "above,"

"below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the process to be operated in a particular orientation. Terms, such as "connected," "connecting," "attached," "attaching," "join" and "joining" are used interchangeably and refer to one structure or surface being secured to another structure or surface or integrally fabricated in one piece.

The above description is given by way of example only, and various modifications may be made by those skilled in the art. The above specification, examples, and data provide a complete description of the structure and use of exemplary embodiments. Although various embodiments have been described above with a certain degree of particularity or with reference to one or more individual embodiments, those skilled in the art could make numerous alterations to the disclosed embodiments without departing from the scope of this specification.

What is claimed is:

1. A vehicle light assembly comprising:
   a light housing assembly comprising a light housing, a light cover attached to the light housing, and a vehicle light; and
   a mounting assembly comprising one or more rigid mounting rails configured to removably attach and detach one or more accessories thereto, the rigid mounting rails being removably coupled to the light housing assembly, having a unitary construction with the light housing assembly, or both;
   wherein the mounting assembly further comprises a seat track mounting assembly having a plurality of seat track rails;
   wherein each seat track rail further comprises:
      a longitudinal body portion with an upper surface, a lower surface, and spaced apart openings, wherein the longitudinal body portion of each seat track rail is oriented parallel to the other;
      a plurality of longitudinally spaced apart mounting assembly apertures extending in a transverse direction wherein each mounting assembly aperture is disposed within an opening; and
      a plurality of longitudinally spaced apart longitudinal apertures, wherein each longitudinal aperture is disposed between two mounting assembly apertures.

2. The assembly of claim 1 further comprises one or more quick release rail lock mechanisms configured to removably couple the accessory to the mounting assembly.

3. The assembly of claim 1 wherein the light housing assembly comprises an internal compartment.

4. The assembly of claim 1 wherein the light cover further comprises one or more protruding lock pins configured to be received within one or more light cover recess latches on the light housing.

5. The assembly of claim 1 wherein the mounting rails are Picatinny, Weaver, seat track mounting rails, or a combination thereof.

6. The assembly of claim 1 wherein the light housing further comprises one or more rail recesses for receipt of the one or more mounting rails.

7. The assembly of claim 1 wherein the light housing assembly, the mounting assembly, or both are constructed from metal, aluminum, stainless steel, carbon fiber, or a combination thereof.

8. The assembly of claim 1 wherein the seat track rails have a superior-inferior orientation, an anterior-posterior orientation, or a combination thereof.

9. The assembly of claim 1 wherein the seat track rails are milled or otherwise constructed directly into the light housing assembly, the seat track rails further comprising a generally C-shaped cross-section defined by a horizontal lower portion extending laterally between upstanding outer side walls and horizontal upper portions respectively extending laterally from each of the upstanding outer side walls forming a channel therein.

10. The assembly of claim 1 wherein the seat track rails of the seat track mounting assembly are spaced for mounting a single accessory.

11. The assembly of claim 1 wherein the light housing assembly further comprises one or more angled housing fingers for attachment to a vehicle.

12. The assembly of claim 1 wherein the light housing assembly further comprises a clamping assembly for attachment to a vehicle.

13. The assembly of claim 3 further comprises a light cover lock assembly.

14. The assembly of claim 5 wherein the mounting rails comprise a longitudinal body portion with an upper surface, a lower surface, and spaced apart access openings, the mounting rails further comprising a plurality of longitudinally spaced apart grooves and ridges extending in a transverse direction.

15. The assembly of claim 6 wherein the rail recess comprises one or more annular attachment protrusions configured to be received within one or more attachment apertures on a rear surface of the mounting rail.

16. The assembly of claim 12 wherein the clamping assembly further comprises a mounting block having an inner contact surface.

17. The assembly of claim 16 wherein the inner contact surface further comprises a contoured ridge and a terminal edge forming an intermediate contoured channel.

18. The assembly of claim 17 wherein the contoured channel includes one or more fastener apertures.

19. A light assembly removably attachable to a vehicle, the light assembly comprising:
   a light housing assembly constructed as a unitary light housing having a top exterior surface, a bottom exterior surface, exterior side surfaces, a front exterior surface, and a rear exterior surface; and
   a seat track mounting assembly comprising one or more seat track rails milled or otherwise constructed directly into the unitary light housing, the seat track mounting assembly comprising a generally C-shaped cross-section defined by a horizontal lower portion extending laterally between upstanding outer side walls and horizontal upper portions respectively extending laterally from each of the upstanding outer side walls forming a channel therein;
   wherein the seat track rail of the seat track mounting assembly further comprises:
      a longitudinal body portion with an upper surface, a lower surface and spaced apart openings, wherein the longitudinal body portion of each seat track rail is oriented parallel to the other;
      a plurality of longitudinally aced apart mounting assembly apertures extending in a transverse direction, wherein each mounting assembly aperture is disposed within an opening; and a plurality of longitudinally spaced apart longitudinal apertures, wherein each longitudinal aperture is disposed between two mounting a res.

20. The assembly of claim 19 wherein the light housing assembly further comprises a clamping assembly for attachment to a vehicle.

21. The assembly of claim 20 wherein the clamping assembly further comprises a mounting block having an inner contact surface.

22. The assembly of claim 21 wherein the inner contact surface further comprises a contoured ridge and a terminal edge forming an intermediate contoured channel.

23. The assembly of claim 22 wherein the contoured channel includes one or more fastener apertures.

24. A seat track mounting assembly comprising:
a plurality of seat track rails constructed on a unitary seat track mounting assembly body, the seat track rails comprising a generally C-shaped cross-section defined by a horizontal lower portion extending laterally between upstanding outer side walls and horizontal upper portions respectively extending laterally from each of the upstanding outer side walls forming a channel therein, the seat track rail further comprises:
a longitudinal body portion with an upper surface, a lower surface, and spaced apart openings, wherein the longitudinal body portion of each seat track rail is oriented parallel to the other;
a plurality of longitudinally spaced apart mounting assembly apertures extending in a transverse direction, wherein each mounting assembly aperture is disposed within an opening; and
a plurality of longitudinally spaced apart longitudinal apertures, wherein each longitudinal aperture is disposed between two mounting assembly apertures.

* * * * *